United States Patent
Huang et al.

(10) Patent No.: US 12,051,358 B2
(45) Date of Patent: Jul. 30, 2024

(54) INTERFACE DISPLAY METHOD AND ELECTRONIC DEVICE

(71) Applicant: Huawei Technologies Co., Ltd., Shenzhen (CN)

(72) Inventors: Liwei Huang, Shenzhen (CN); Binke Yu, Shenzhen (CN); Haiyan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/044,178

(22) PCT Filed: Aug. 6, 2021

(86) PCT No.: PCT/CN2021/111323
§ 371 (c)(1),
(2) Date: Mar. 6, 2023

(87) PCT Pub. No.: WO2022/048401
PCT Pub. Date: Mar. 10, 2022

(65) Prior Publication Data
US 2023/0326393 A1    Oct. 12, 2023

(30) Foreign Application Priority Data
Sep. 7, 2020 (CN) .......................... 202010930870.4

(51) Int. Cl.
*G09G 3/34* (2006.01)
*G06F 1/32* (2019.01)
(Continued)

(52) U.S. Cl.
CPC ..... *G09G 3/293* (2013.01); *G09G 2310/0245* (2013.01); *G09G 2320/10* (2013.01); *G09G 2330/02* (2013.01)

(58) Field of Classification Search
CPC ........... G09G 3/293; G09G 2310/0245; G09G 2320/10; G09G 2330/02
See application file for complete search history.

(56) References Cited

U.S. PATENT DOCUMENTS

2007/0180395 A1 * 8/2007 Yamashita ............... G09G 5/14
715/778
2009/0259968 A1   10/2009 Hsieh et al.
(Continued)

FOREIGN PATENT DOCUMENTS

CN    105103214 A  * 11/2015
CN    106161789 A    11/2016
(Continued)

*Primary Examiner* — Lin Li
(74) *Attorney, Agent, or Firm* — Slater Matsil, LLP

(57) ABSTRACT

An interface display method and an electronic device are provided. The method includes: In an AOD stage, an electronic device receives a screen-on operation. The electronic device displays a first interface when receiving the screen-on operation. The first interface includes a first wallpaper and a first wallpaper upper-layer element. In response to the screen-on operation, the electronic device exits the AOD stage and displays a second interface. The second interface includes a second wallpaper upper-layer element and a second wallpaper. The first interface is associated with or the same as the second interface. In the technical solution, a background wallpaper seems to be dynamically and continuously played when the electronic device enters the second interface from the first interface, thereby helping to enhance a visual effect of interface presentation.

12 Claims, 14 Drawing Sheets

(51) Int. Cl.
   *G06F 1/3296*    (2019.01)
   *G06F 21/32*     (2013.01)
   *G09G 3/00*      (2006.01)
   *G09G 3/293*     (2013.01)
   *G09G 5/10*      (2006.01)
   *G09G 5/14*      (2006.01)

(56) References Cited

U.S. PATENT DOCUMENTS

| | | | |
|---|---|---|---|
| 2014/0049566 A1* | 2/2014 | Sudou | G09G 3/007 |
| | | | 345/681 |
| 2014/0122911 A1* | 5/2014 | Gunn | G06F 1/3265 |
| | | | 713/323 |
| 2015/0138214 A1* | 5/2015 | Roh | G02B 27/0101 |
| | | | 345/1.3 |
| 2017/0148390 A1* | 5/2017 | Park | G06F 1/3296 |
| 2018/0059774 A1* | 3/2018 | Lee | G09G 5/10 |
| 2018/0240260 A1 | 8/2018 | Lee et al. | |
| 2018/0268777 A1 | 9/2018 | Kim et al. | |
| 2019/0369695 A1* | 12/2019 | Wang | G06F 21/32 |
| 2020/0335052 A1* | 10/2020 | Guynes | G09G 3/3406 |

FOREIGN PATENT DOCUMENTS

| | | | | |
|---|---|---|---|---|
| CN | 108334253 A | | 7/2018 | |
| CN | 108650423 A | | 10/2018 | |
| CN | 108733428 A | | 11/2018 | |
| CN | 108762859 A | | 11/2018 | |
| CN | 109739602 A | | 5/2019 | |
| CN | 110045936 A | * | 7/2019 | ............ G06F 3/147 |
| CN | 111580904 A | | 8/2020 | |
| JP | 2018073287 A | | 5/2018 | |
| WO | 2022242422 A1 | | 11/2022 | |

\* cited by examiner

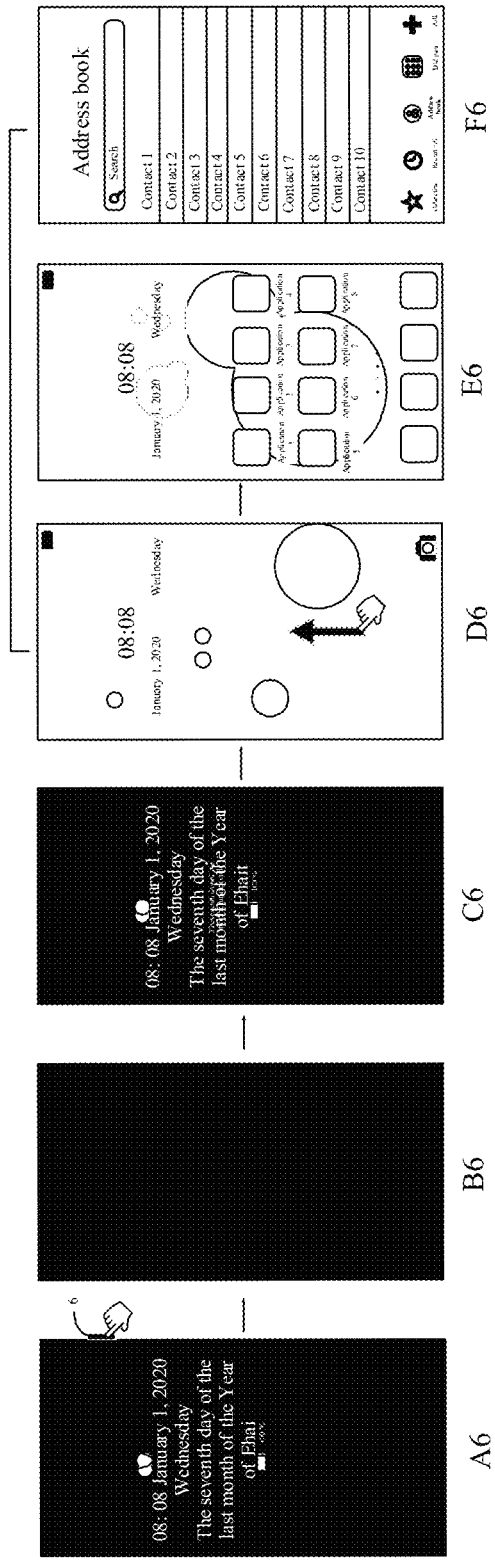

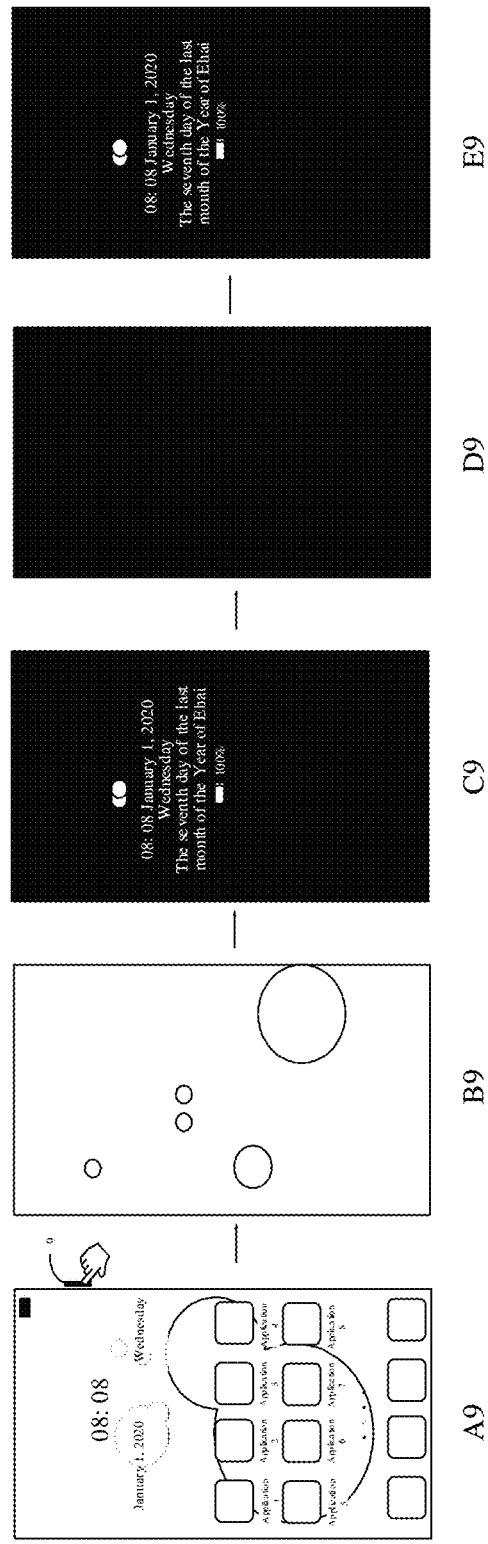

INTERFACE DISPLAY METHOD AND ELECTRONIC DEVICE

CROSS-REFERENCE TO RELATED APPLICATIONS

This application is a National Stage of International Application No. PCT/CN2021/111323, filed on Aug. 6, 2021, which claims priority to Chinese Patent 202010930870.4, filed on Sep. 7, 2020. The disclosures of the aforementioned applications are hereby incorporated by reference in their entireties.

TECHNICAL FIELD

This application relates to the technical field of terminals, and in particular, to an interface display method and an electronic device.

BACKGROUND

Always on display (always on display, AOD) means that after a display screen of a terminal (such as a mobile phone or a tablet computer) is powered off, a partial region of the display screen may be powered on to display an AOD interface. The AOD interface may include information such as time, a date, and a notification, so that a user can view the time, the date, the notification, and the like without performing an operation. In addition, the AOD interface may further include a background wallpaper to enhance a visual effect of the AOD interface.

Specifically, when the terminal displays the AOD interface, the user may tap a power key to power on the entire display screen, enter a screen locked interface, and enter a desktop after the interface is unlocked. However, when the terminal is switched from the AOD interface to the screen locked interface and then switched from the screen locked interface to the desktop, background wallpapers in different interface display stages are presented independently of each other, and cannot be visually associated. Therefore, the visual effect of presentation is relatively poor, which cannot meet requirements of users for cool and personalized interface display.

SUMMARY

Embodiments of this application provide an interface display method and an electronic device, so that background wallpapers are dynamically and continuously played when the electronic device enters a desktop or a screen locked interface from an AOD interface and returns to the AOD interface from the desktop or the screen locked interface, thereby helping to enhance a visual effect of interface presentation and meeting requirements of users for cool and personalized interface display.

According to a first aspect, an embodiment of this application provides an interface display method, and the method specifically includes: In an AOD stage, an electronic device receives a screen-on operation. The electronic device displays a first interface when receiving the screen-on operation. The first interface includes a first wallpaper and a first wallpaper upper-layer element. In response to the screen-on operation, the electronic device exits the AOD stage and displays a second interface. The second interface includes a second wallpaper upper-layer element and a second wallpaper, where the first interface is associated with or the same as the second interface.

In this embodiment of this application, the second interface is associated with or the same as the first interface, so that a background wallpaper seems to be dynamically and continuously played when the electronic device enters the second interface from the first interface, thereby helping to enhance a visual effect of interface presentation. In addition, the electronic device exits the AOD stage and then displays the second interface, thereby helping to reduce power consumption of the electronic device.

In a possible design, in this embodiment of this application, the first interface may be associated with or the same as the second interface in the following manner:

The first wallpaper is associated with or the same as the second wallpaper; and/or a layout of the first wallpaper upper-layer element is associated with or the same as a layout of the second wallpaper upper-layer element. This helps to simplify an implementation.

In a possible design, the second wallpaper is a first frame of picture of a first live wallpaper. The electronic device sequentially displays a second frame of picture to an Nth frame of picture of the live wallpaper after displaying the second interface, where N is a positive integer greater than or equal to 2. This helps to further enhance the visual effect of interface presentation.

In a possible design, in a screen locking display stage, the electronic device receives a screen-off operation. In response to the screen-off operation, the electronic device sequentially displays the Nth frame of picture to the first frame of picture of the first live wallpaper. This helps to further enhance the visual effect of interface presentation from the screen locking display stage to the AOD stage.

In a possible design, after displaying the first frame of picture of the first live wallpaper, the electronic device enters the AOD stage and displays a third interface. The third interface includes the third wallpaper and a third wallpaper upper-layer element. The first wallpaper is the same as the third wallpaper, and a layout of the third wallpaper upper-layer element is the same as the layout of the first wallpaper upper-layer element.

In a possible design, in a screen locking display stage, the electronic device receives an unlock operation. The electronic device displays a fourth interface when receiving the unlock operation. The fourth interface includes a fourth wallpaper. In response to the unlock operation, the electronic device exits the screen locking stage and displays a fifth interface. The fifth interface includes a fifth wallpaper, and the fourth wallpaper is the same as or associated with the fifth wallpaper. This helps to further enhance the visual effect of interface presentation from the screen locking display stage to a screen unlocking display stage.

In a possible design, the fifth wallpaper is a first frame of picture of a second live wallpaper. After displaying the fifth interface, the electronic device displays a second frame of picture to an Mth frame of picture of the second live wallpaper, where M is a positive integer greater than or equal to 2. This helps to further enhance the visual effect of interface presentation from the screen locking display stage to the screen unlocking display stage.

In a possible design, in a screen unlocking display stage, the electronic device receives a screen-off operation.

In response to the screen-off operation, the electronic device exits the screen unlocking display stage and sequentially displays the Mth frame of picture to the first frame of picture of the second live wallpaper and the Nth frame of picture to the first frame of picture of the first live wallpaper. The electronic device enters the AOD stage after displaying the first frame of picture of the first live wallpaper.

The sequentially displaying the Mth frame of picture to the first frame of picture of the second live wallpaper and the Nth frame of picture to the first frame of picture of the first live wallpaper may be understood as first sequentially displaying the Mth frame of picture to the first frame of picture of the second live wallpaper, and then sequentially displaying, after the displaying of the first frame of picture of the second live wallpaper ends, the Nth frame of picture to the first frame of picture of the first live wallpaper.

This helps to enhance the visual effect of interface presentation from the screen unlocking display stage to the AOD stage.

In a possible design, the electronic device displays a sixth interface after entering the AOD stage. The sixth interface includes a sixth wallpaper, and the sixth wallpaper is the same as or associated with the first frame of picture of the first live wallpaper.

In a possible design, in this embodiment of this application, the electronic device may be enabled to display the second interface in response to the screen-on operation in the following manner:

In response to the screen-on operation, the electronic device obtains first position information. The first position information is used for indicating a position of a screen-on region on the first interface. The electronic device displays the second interface according to the first position information. This helps to simplify an implementation.

In a possible design, the position of the screen-on region includes a display position of the first wallpaper and a display position of the first wallpaper upper-layer element.

In a possible design, the electronic device displays the second interface based on the first position information in the following manner:

The electronic device determines a position of a display object of the second wallpaper according to the display position of the first wallpaper, determines a display position of the second wallpaper upper-layer element according to the display position of the first wallpaper upper-layer element, and displays the second interface according to the position of the display object and the display position of the second wallpaper upper-layer element. This helps to simplify an implementation.

In a possible design, that in response to the screen-on operation, the electronic device exits the AOD stage and displays a second interface includes the following two cases:

In response to the screen-on operation, the electronic device exits the AOD stage, enters a screen locking stage, and displays the second interface; or in response to the screen-on operation, the electronic device exits the AOD stage, enters a desktop stage, and displays the second interface.

According to a second aspect, an electronic device of an embodiment of this application is provided. The electronic device includes modules/units that perform the method of the above first aspect or any one of possible designs of the first aspect. These modules/units may be implemented by hardware or by hardware executing corresponding software.

According to a third aspect, a chip provided by an embodiment of this application is provided. The chip is coupled to a memory in an electronic device, and is configured to invoke a computer program stored in the memory and execute the technical solutions of the first aspect and any one of possible designs of the first aspect in embodiments of this application. In this embodiment of this application, "couple" means that two components are directly or indirectly combined with each other.

According to a fourth aspect, a computer-readable storage medium of an embodiment of this application is provided. The computer-readable storage medium includes a computer program. When the computer program runs in an electronic device, the electronic device is enabled to perform the technical solutions of the above first aspect and any one of possible designs of the first aspect.

According to a fifth aspect, a computer program of an embodiment of this application is provided. The computer program includes instructions. When the instructions run in a computer, the computer is enabled to perform the technical solutions of the above first aspect and any one of possible designs of the first aspect.

According to a sixth aspect, a graphical user interface on an electronic device of an embodiment of this application is provided. The electronic device has a display screen, one or more memories, and one or more processors. The one or more processors are configured to execute one or more computer programs stored in the one or more memories, and the graphical user interface includes graphical user interfaces displayed when the electronic device performs the technical solutions of the above first aspect and any one of possible designs of the first aspect.

For beneficial effects of the second aspect to the sixth aspect, a reference is made to the beneficial effects of the first aspect. Details are not described again.

BRIEF DESCRIPTION OF THE DRAWINGS

FIG. 6A is a schematic diagram of displaying an interface according to an embodiment of this application;

FIG. 9A is a schematic diagram of displaying another interface according to an embodiment of this application;

DETAILED DESCRIPTION OF ILLUSTRATIVE EMBODIMENTS

Figure 1A:
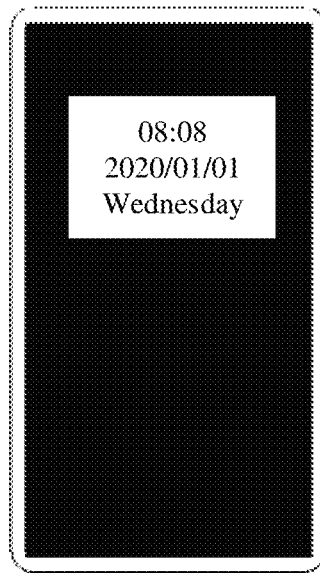
FIG. 1A is a schematic diagram of an AOD interface according to an embodiment of this application.

With introduction of AOD, when a display screen of an electronic device is powered off, a partial region of the display screen may be powered on to display an AOD interface. The AOD interface may include information such as time, a date, and a notification, so that a user can view the time, the date, the notification, and the like without operating the electronic device to power on a display screen. The information such as the time, the date, or the notification may be understood as wallpaper upper-layer elements. For example, as shown in FIG. 1A, the AOD interface includes time and a date.

Figure 1B:
FIG. 1B is a schematic diagram of another AOD interface according to an embodiment of this application.

In addition, the AOD interface may further include a background wallpaper to enhance a visual effect of the AOD interface. For example, as shown in FIG. 1B, the AOD interface includes time, a date, and a background wallpaper. It can be understood that the background wallpaper may overlap the time and/or the date. For example, when the background wallpaper overlaps the time and/or the date, the time and/or the date are/is located above the background wallpaper, so as to avoid that the background wallpaper covers the time and/or the date and affects a user to view the time and/or the date.

The background wallpaper included in the AOD interface may be dynamic or static. Generally, in order to reduce power consumption of the electronic device, the background wallpaper included in the AOD interface is static, that is, the background wallpaper presented in the AOD interface to the user is one frame or one picture.

It can be understood that when the background wallpaper is static, the background wallpaper is a static wallpaper. One static wallpaper may be understood as one frame or one picture or photo. When the background wallpaper is dynamic, the background wallpaper is a live wallpaper. One live wallpaper may include a plurality of frames or a plurality of associated pictures or photos. The electronic device may sequentially display, according to an association order of the pictures, the plurality of frames of associated pictures included in the live wallpaper, so as to form a forward animation effect. Or, the electronic device may display, in a reverse order according to an association order of the pictures, the plurality of frames of pictures included in the live wallpaper, so as to form a reverse animation effect. For example, a live wallpaper includes 10 frames of associated pictures, which are successively a picture 1 to a picture 10. When the electronic device displays the live wallpaper on the display screen, if the live wallpaper is sequentially played in an order from the picture 1 to the picture 10, the electronic device presents the forward animation effect to the user, and if the live wallpaper is sequentially played in an order from the picture 10 to the picture 1, the electronic device presents the reverse animation effect to the user.

It should be noted that when the screen of the electronic device is powered off, a position of a screen-on region is changing, so as to prevent the display screen from being burnt. For example, a position of the time and the date that are included in the AOD interface shown in FIG. 1A is the position of the screen-on region when the screen of the electronic device is powered off. Therefore, the position of the time and the date that are included in the AOD interface shown in FIG. 1A is changing. For another example, a position of the time, the date, and the background wallpaper that are included in the AOD interface shown in FIG. 1B is the position of the screen-on region when the screen of the electronic device is powered off. Therefore, the position of the time, the date, and the background wallpaper that are included in the AOD interface shown in FIG. 1B is changing. Specifically, when the position of the time, the date, and the background wallpaper changes, a relative position relationship of the time, the date, and the background wallpaper may change or may not change. This is not limited.

When the electronic device displays the AOD interface, the user may tap a power key or a home key to power on the display screen to enter a screen locked interface and enter a desktop after the screen is unlocked. However, when the electronic device enters a screen locked interface from the AOD interface, and then enters the desktop from the screen locked interface, background wallpapers are presented independently in different interface display stages. In other words, when the screen of the electronic device is powered off, the AOD interface is displayed on the display screen, and a background wallpaper of a screen-off stage is presented to the user. If the electronic device is not unlocked after the screen is powered on, the screen locked interface is displayed on the display screen, and a background wallpaper of a screen locking stage is presented to the user. After the electronic device is unlocked, the desktop is displayed on the display screen, and a background wallpaper displayed after unlocking is presented to the user. In this case, even if the background wallpaper of the screen locking stage and the background wallpaper displayed after unlocking are a same live wallpaper, when the electronic device displays the screen locked interface, regardless of how far the live wallpaper of the screen locking stage is played, if the electronic device is unlocked, the electronic device stops playing the live wallpaper of the screen locking stage, displays the desktop, and then plays the live wallpaper from the beginning instead of continuing to play the live wallpaper from where the playing of the live wallpaper of the screen locking stage is stopped. As a result, a visual effect of presentation is relatively poor, requirements of the user for cool and personalized interface display cannot be met.

For example, the background wallpaper of the screen locking stage and the background wallpaper displayed after unlocking are both a live wallpaper 1, and the live wallpaper 1 includes 15 frames of associated pictures, which are successively a picture 1 to a picture 15. If the electronic device starts to play the live wallpaper 1 from the picture 1 according to an order from the picture 1 to the picture 15, when the picture 6 of the live wallpaper is played, the user unlocks the electronic device, and the electronic device is switched from the screen locked interface to the desktop. When the electronic device displays the desktop on the display screen, the live wallpaper 1 will be played from the picture 1 according to the order from the picture 1 to the picture 15, instead of being continued to be played from the picture 7. Therefore, when the electronic device enters the desktop from the screen locked interface, the pictures presented to the user are incoherent, resulting in a relatively poor visual effect of presentation.

It should be noted that in this embodiment of this application, the screen-off stage may also be referred to as an always on display stage or an AOD stage, which refers to a stage in which the AOD interface is displayed when the screen of the electronic device is powered off. The background wallpaper of the screen-off stage is a background wallpaper included in the AOD interface and belongs to a portion of the AOD interface. The screen locking stage is a stage of displaying the screen locked interface when the screen of the electronic device is powered on, where the electronic device is not unlocked in the screen locking stage. It should be noted that the background wallpaper in the screen locking stage is not a portion of the screen locked interface. The background wallpaper displayed after unlocking refers to a background wallpaper included in the desktop, and belongs to a portion of the desktop. A stage of displaying an interface by the electronic device after unlocking is a screen unlocking display stage. In the screen unlocking display stage, the electronic device may display the desktop.

It should be understood that the screen locked interface in this embodiment of this application may include wallpaper upper-layer elements such as a timer, a date, a notification, or unlock prompt information. In this embodiment of this application, the background wallpaper included in the screen locked interface may be transparent.

In view of this, embodiments of this application provide an interface display method, so that background wallpapers are dynamically and continuously played when the electronic device enters a desktop or a screen locked interface from an AOD interface and returns to the AOD interface from the desktop or the screen locked interface, thereby helping to enhance a visual effect of interface presentation and meeting requirements of users for cool and personalized interface display.

It should be understood that "at least one" in embodiments of this application refers to one or more. "A plurality of" means two or more than two. "And/or" describes an association relationship between associated objects, and indicates that three relationships may exist. For example, A and/or B may represent the following three cases: Only A exists, both A and B exist, and only B exists. A and B may be singular or plural. The character "/" usually indicates an "or" relationship between associated objects. "At least one of the following pieces (items)" or a similar expression thereof indicates any combination of these items, including a single item (piece) or any combination of a plurality of items (pieces). For example, at least one of a, b, or c may represent seven cases: a, b, c, a and b, a and c, b and c, and a, b and c. Each of a, b, and c may be an element, or may be a set including one or more elements.

In this application, "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Exactly, the word "an example" is used to present a concept in a specific manner.

It should be noted that, in embodiments of this application, terms such as "first" and "second" are only used for a purpose of distinction in description, and should not be understood as an indication or implication of relative importance or an indication or implication of a sequence.

The electronic device of this embodiment of this application may be a portable terminal, for example, a mobile phone, a tablet computer, a notebook computer, or a wearable electronic device (such as a smart watch). For example, the portable terminal includes but is not limited to carrying IOS®, Android®, Windows®, or other operating systems. In addition, the electronic device of this embodiment of this application may not be a portable terminal, for example, a desktop computer with a touch-sensitive surface.

Figure 2:
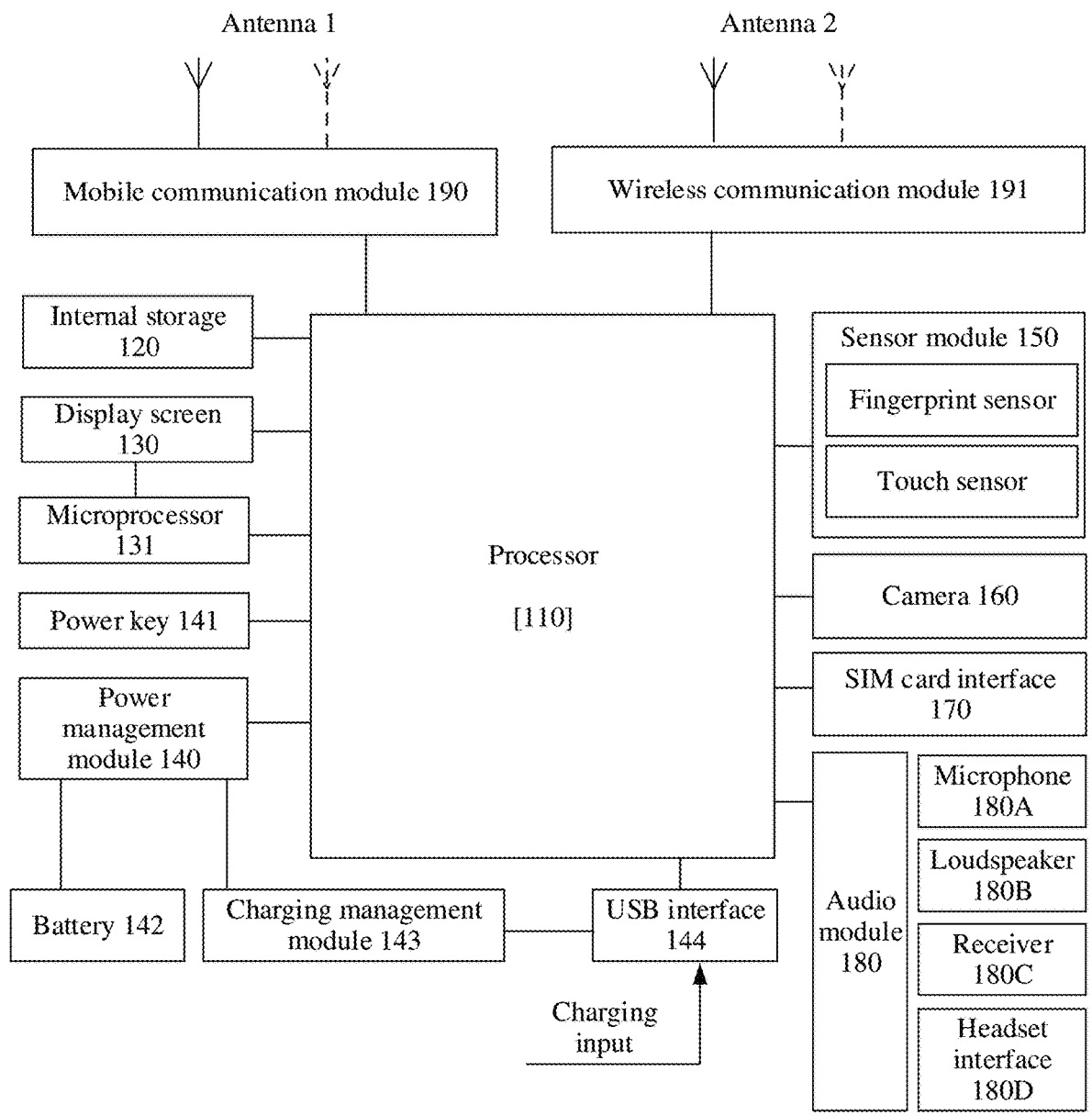
FIG. 2 is a schematic diagram of a hardware structure of a terminal according to an embodiment of this application.

A terminal used as the electronic device is taken as an example. For example, FIG. 2 is a schematic diagram of a hardware structure of a terminal according to an embodiment of this application. Specifically, as shown in the figure, the terminal includes a processor 110, an internal storage 120, a display screen 130, a microprocessor 131, a power management module 140, a power key 141, a battery 142, a charging management module 143, a universal serial bus (universal serial bus, USB) interface 144, a sensor module 150, a camera 160, a subscriber identification module (subscriber identification module, SIM) card interface 170, an audio module 180, a microphone 180A, a loudspeaker 180B, a receiver 180C, a headset interface 180D, a mobile communication module 190, a wireless communication module 191, and the like. The sensor module 180 may include a fingerprint sensor, a touch sensor, and the like.

Specifically, the processor 110 may include one or more processing units. For example, the processor 110 may include an application processor (application processor, AP), a modem (modem), a graphics processing unit (graphics processing unit, GPU), an image signal processor (image signal processor, ISP), a video codec, a digital signal processor (digital signal processor, DSP), a baseband processor, and/or a neural-network processing unit (neural-network processing unit, NPU), and the like. Different processing units may be independent components, or two or more different processing units may be integrated into one component.

A memory may be further arranged in the processor 110, and is configured to store a program and/or data. In some embodiments, the storage in the processor 110 is a cache. The memory may store a program and/or data that is just used or cyclically used by the processor 110. If the processor 110 needs to use the program and/or the data again, the processor 110 may directly invoke the program and/or the data from the memory. This avoids repeated access, reduces waiting time of the processor 110, and improves system efficiency.

In some embodiments, the processor 110 may include one or more interfaces. For example, the processor 110 includes a USB interface 144 and a SIM card interface 170. For another example, the processor 110 may further include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and/or the like.

The USB port 130 is a port that conforms to a USB standard specification, and may be specifically a mini USB port, a micro USB port, a USB Type-C port, or the like. The USB interface 130 may be configured to be connected to a charger to charge the terminal, or configured to transmit data between the terminal and a peripheral device, or configured to be connected to a headset to play audios via a headset. The interface may be further configured to be connected to another terminal, for example, an AR device.

The SIM card interface 170 is configured to be connected to a SIM card. The SIM card may be inserted into the SIM card interface 170 or removed from the SIM card interface 170 to implement contact with and separation from the terminal. The terminal may support two or N SIM card interfaces, where N is a positive integer greater than 2. The SIM card may include a Nano SIM card, a Micro SIM card, a SIM card, and the like. A plurality of SIM cards may be simultaneously inserted into a same SIM card interface 170. The plurality of SIM cards may be of a same type or different types. In some embodiments, the SIM card interface 170 may also be compatible with an external storage card. Or, in this embodiment of this application, the terminal may also use an embedded SIM card, namely, eSIM. The eSIM is integrated or embedded in the terminal, and cannot be separated from the terminal.

It can be understood that an interface connection relationship between all the modules shown in FIG. 2 in this embodiment of this application is merely a schematic description, and does not constitute a structural limitation on the terminal. For example, in some other embodiments, the modules in the terminal shown in FIG. 2 may also be connected to each other by using buses, and the bus may include an address bus, a data bus, a control bus, and/or the like.

The power management module 140 is configured to be connected to the battery 142, the charging management module 143, and the processor 110. The power management module 140 receives an input from the battery 142 and/or the charging management module 143, and supplies power to the processor 110, the internal storage 120, the display 130, the camera 160, the wireless communication module 191, and the like. The power management module 140 may be configured to monitor parameters such as a battery capacity, a battery cycle number, and a battery state of health (electric leakage and impedance). In some other embodiments, the power management module 140 may alternatively be disposed in the processor 110. Or, the power management module 140 and the charging management module 143 may be arranged in a same device.

The power key 141 is used by the user to control power-on, power-off, screen-on, and screen-off of the terminal. For example, when the terminal is powered off, the terminal is powered on in response to a long-press operation by the user on the power key 141. For another example, when the screen of the terminal is off, the screen of the terminal is powered on in response to an operation of tapping the power key 141 by the user. For another example, when the screen of the terminal is on, the screen of the terminal is powered off in response to an operation of tapping the power key 141 by the user. For example, when displaying a screen locked interface or a desktop, the terminal enters an AOD interface in response to the operation of tapping the power key 141 by the user, that is, the AOD interface is displayed on the display screen. For another example, when displaying an AOD interface, the terminal enters a desktop or a screen locked interface in response to the operation of tapping the power key 141 by the user, that is, the desktop or the screen locked interface is displayed on the display screen.

The charging management module 143 is configured to receive a charging input from the charger. The charger may be a wireless charger or a wired charger. In some embodiments of wired charging, the charging management module 143 may receive a charging input from a wired charger through the USB interface 144. In some embodiments of wireless charging, the charging management module 143 may receive a wireless charging input through a wireless charging coil of the terminal. When charging the battery 142, the charging management module 143 may further supply power to other modules on the terminal by using the power management module 140.

A wireless communication function of the terminal may be implemented by using an antenna 1, an antenna 2, a mobile communication module 190, a wireless communication module 191, a modem, a baseband processor, and the like.

The mobile communication module 190 may provide a wireless communication solution that is applied to the terminal and that includes standards such as 2G/3G/4G/5G. The mobile communication module 190 may include at least one filter, a switch, a power amplifier, a low noise amplifier (low noise amplifier, LNA), and the like.

The wireless communication module 191 may provide solutions that are applied to the terminal device and include wireless communications such as a wireless local area network (wireless local area network, WLAN) (for example, a Wi-Fi network), bluetooth (bluetooth, BT), a global navigation satellite system (global navigation satellite system, GNSS), frequency modulation (frequency modulation, FM), a near field communication (near field communication, NFC) technology, or an infrared (infrared, IR) technology.

In some embodiments, the antenna 1 of the terminal is coupled to the mobile communication module 190, and the antenna 2 is coupled to the wireless communication module 191, so that the terminal can be enabled to communicate with a network and other devices by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a Global Navigation Satellite System (Global Navigation Satellite System, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The terminal implements a display function by using a GPU, a display screen 130, an application processor, or the like. The display screen 130 is configured to display a user interface, such as an AOD interface, a screen locked interface, a desktop interface, or an application program (such as address book or setting) interface. For example, after the screen of the terminal is powered off, the AOD interface displayed on the display screen 130 is controlled by the microprocessor 131. After the screen of the terminal is powered on, an interface (for example, a screen locked interface or a desktop) displayed on the display screen 130 is controlled by the processor 110. Generally, the power consumption of the microprocessor 131 is less than that of the processor 110. For example, the microprocessor 131 may be a sensor hub.

The display 130 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMO-LED), a flex light-emitting diode (flex light-emitting diode, FLED), a MiniLED, a MicroLED, a Micro-OLED, a quantum dot light emitting diode (quantum dot light emitting diode, QLED), or the like. In some embodiments, the terminal may include one or N display screens 130, where N is a positive integer greater than 1.

The terminal may implement an image capturing function by using an ISP, a camera 160, a video codec, a GPU, the display screen 130, the application processor, or the like.

The internal storage 120 includes a running memory (memory) and a built-in storage. The running memory may be configured to store a program and/or data, and the like. The processor 110 runs the program stored in the running memory, so as to perform various functional applications and data processing that are interrupted. For example, the running memory may include a high speed random access memory. The built-in storage may also be referred to as a built-in external memory or the like, and may be configured to store a program and/or data. For example, the built-in storage may store an operating system, an application, and the like. Generally, after the terminal loads the program and/or data in the built-in storage to the running memory, the processor 110 is enabled to run a corresponding program and/or data to implement a corresponding function. In addition, the internal storage 120 may include a nonvolatile memory, for example, at least one magnetic disk storage device, a flash memory, and a universal flash storage (universal flash storage, UFS).

The terminal may realize an audio function by using an audio module 180, a loudspeaker 180A, a receiver 180B, a microphone 180C, a headset interface 180D, an application processor, and the like, such as playing music and making a record.

It can be understood that the structure shown in this embodiment of this application does not constitute a specific limitation on the terminal. In some other embodiments of this application, the terminal may include more or fewer components than those shown in the figure, or some components may be combined, or some components may be split, or there may be a different component layout. The components shown in the figure may be implemented by using hardware, software, or a combination of software and hardware.

An animation display method of this embodiment of this application is described in detail with reference to a specific scenario by using a terminal having a hardware structure shown in FIG. 2 as an example.

Figure 3:
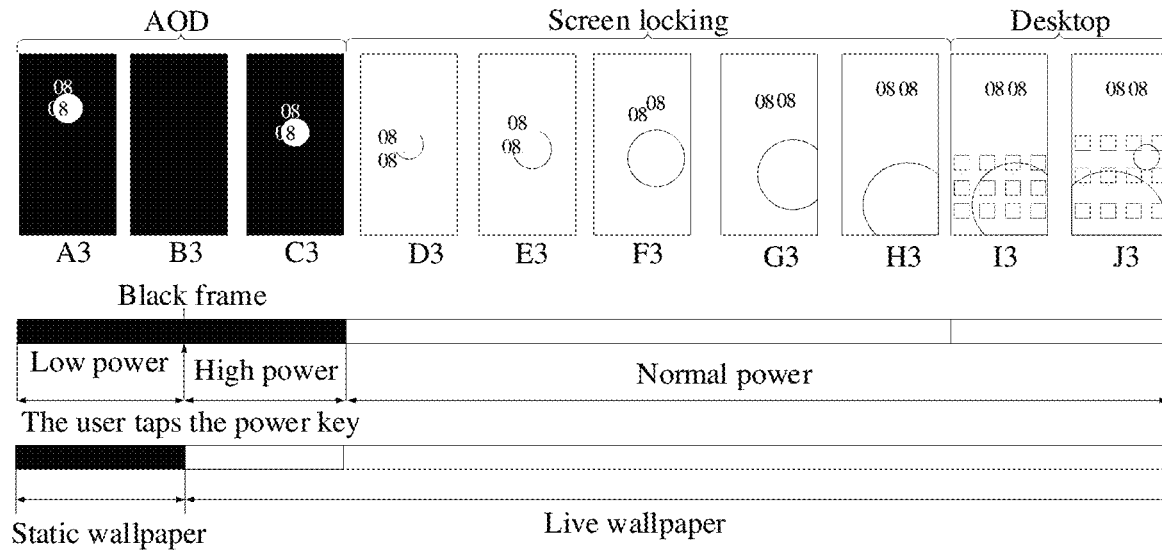
FIG. 3 is a schematic diagram of displaying an interface according to an embodiment of this application.

As shown in FIG. 3, interfaces A3 to C3 are interfaces displayed when the screen of the terminal is powered off, and interfaces D3 to J3 are interfaces displayed when the screen of the terminal is powered on. The interfaces A3 and C3 are AOD interfaces; the interface B3 is a black frame; the interfaces D3 to H3 are screen locked interfaces; and the interfaces 13 and J3 are desktops. It should be noted that the interfaces A3 and C3 show only background wallpapers of a screen-off stage, and do not show information such as time, a date, and a notification. The interfaces D3 to H3 show only background wallpapers of a screen locking stage, and do not show information such as time and a date. The interfaces I3 and J3 shown in FIG. 3 show only background wallpapers displayed after unlocking, and do not show information such as icons of application programs on the desktop and time.

For example, in the case where the background wallpaper of the screen locking stage and the background wallpaper displayed after unlocking are live wallpapers, when the interface A3 is displayed on the display screen of the terminal, if the user taps the power key, in response to the operation of tapping the power key by the user, the terminal triggers playing of the live wallpaper, powers on the display screen, and enters the screen locked interface, that is, the screen locked interface and the live wallpaper are displayed on the display screen. For example, the live wallpaper is located under the screen locked interface, so as to prevent the live wallpaper from covering contents on the screen locked interface. The screen of the terminal is controlled to be powered off by the microprocessor, and triggering playing of the live wallpaper involves switching from the microprocessor to the processor. Therefore, in response to the operation of tapping the power key by the user, the terminal will display a black frame, such as the interface B3, on the display screen. Then, after being switched to the processor, the terminal triggers the playing of the live wallpaper and prepares to power on the display screen. During preparation to power on the display screen, the terminal continues to display an AOD interface, such as the interface C3, on the display screen. After the preparation to power on the display screen is completed, the terminal exits the AOD, powers on the display screen, and displays the screen locked interface and the live wallpaper on the display screen. In this way, the user can see, in the screen locking stage, an image of the live wallpaper.

It should be noted that although the terminal triggers the playing of the live wallpaper in response to the operation of tapping the power key by the user, the live wallpaper is not presented on the display screen, but the AOD interface is continued to be displayed. For example, when the terminal displays the interface C3, although the playing of the live wallpaper is triggered, the interface C3 covers the live wallpaper, that is, the live wallpaper is located below the interface C3 and is covered by the interface C3. Therefore, the user cannot watch the played live wallpaper by using the display screen of the terminal, and can watch only the interface C3. Or, the terminal may cover the interface C3 with the live wallpaper, so that the terminal presents the played live wallpaper to the user in the screen-off stage. However, in this case, since the live wallpaper covers the interface C3, the user cannot watch the interface C3 by using the display screen. Or, the terminal may cover, by using the live wallpaper, the background wallpaper included in the interface C3, but the live wallpaper is located below the wallpaper upper-layer element such as the time, the date, or the notification included in the interface C3, so as to prevent the live wallpaper from covering the date, the time, the notification, or the like, so that in the screen-off stage, the user can see, by using the display screen of the terminal, the played live wallpaper and the information such as the time, the date, or the notification included in the interface C3. In this case, the background wallpaper included in the interface C3 is covered by the live wallpaper, and the user cannot see, by using the display screen of the terminal, the background wallpaper included in the interface C3.

Further, when the terminal displays the interface H3, if the user unlocks the terminal (for example, the user slides upward on the interface H3, or by using a password, a fingerprint, or facial recognition), the terminal exits the screen locked interface in response to the unlock operation performed by the user on the terminal, and displays a desktop, such as the interface 13 and the interface J3, on the display screen. The desktop includes a live wallpaper and wallpaper upper-layer elements. During the displaying of the desktop, the terminal continues to play the live wallpaper from where the playing of the live wallpaper is stopped when the terminal exits the screen locked interface. Therefore, when the user enters the screen locked interface from the AOD interface and enters the desktop from the screen locked interface, the background wallpaper seems to be continuously played, and a visual effect is relatively cool.

However, in the foregoing process of implementing the continuous playing of the background wallpaper, the terminal triggers the playing of the live wallpaper in the screen-off stage, so that switching from low power consumption to high power consumption is involved in AOD, thereby easily causing an increase in power consumption of the AOD.

In view of this, an embodiment of this application provides another animation display method. Thus, during AOD, a terminal may exit the AOD in response to an operation of powering on a display screen (that is, a screen-on operation), such as an operation of tapping a power key, and displays a screen locked interface and a background wallpaper of a screen locking stage on the display screen. When the background wallpaper of the screen locking stage is a live wallpaper, different from that the terminal triggers, in response to the operation of powering on the display screen by the user in FIG. 3, the playing of the live wallpaper before exiting the AOD, in this embodiment of this application, the terminal triggers playing of the live wallpaper when exiting the AOD. Therefore, the switching from low power consumption to high power consumption is not involved in the AOD, thereby achieving an objective of reducing the power consumption of the terminal. In addition, the background wallpaper included in the AOD interface of the screen-off stage is associated with the background wallpaper displayed in the screen locking stage. Therefore, a dynamic effect of the background wallpaper presented to the user during transition from the screen-off stage to the screen locking stage seems to be coherent, thereby helping to improve the visual effect.

It should be understood that in this embodiment of this application that the terminal exits the AOD may be understood as that the terminal exits the displaying of the AOD interface.

In this embodiment of this application, that the background wallpaper included in the AOD interface in the screen-off stage is associated with the background wallpaper displayed in the screen locking stage may be understood as that the background wallpaper included in the AOD interface in the screen-off stage is associated with contents presented by the background wallpaper displayed in the screen locking stage, or dynamic effects of the background wallpaper included in the AOD interface in the screen-off stage and contents presented by the background wallpaper displayed in the screen locking stage are continuous. For example, the background wallpaper included in the last frame of AOD interface of the terminal in the screen-off stage is the same as or associated with the background wallpaper when the terminal displays the first frame of screen locked interface in the screen locking stage, that is, the background wallpaper included in the last frame of AOD interface of the terminal in the screen-off stage is the same as or associated with displayed contents of the background wallpaper when the terminal displays the first frame of screen locked interface in the screen locking stage.

When the background wallpaper of the screen locking stage is a live background wallpaper, the background wallpaper when the terminal displays the first frame of screen locked interface in the screen locking stage may be understood as a picture presented by the live wallpaper when the terminal displays the first frame of screen locked interface in the screen locking stage, that is, a first frame of picture of the live wallpaper of the screen locking stage. For example, the live wallpaper of the screen locking stage includes a picture 1 to a picture 10, where contents presented by the picture 1 to the picture 10 are associated. When the live wallpaper of the screen locking stage is sequentially played according to an order from the picture 1 to the picture 10, the picture 1 is the first frame of picture of the live wallpaper of the screen locking stage. Or, when the live wallpaper of the screen locking stage is sequentially played according to an order from the picture 10 to the picture 1, the picture 10 is the first frame of picture of the live wallpaper.

Further, in some embodiments, wallpaper upper-layer elements included in the screen locked interface are associated with wallpaper upper-layer elements included in the AOD interface. For example, a layout of the wallpaper upper-layer elements included in the first frame of screen locked interface of the screen locking stage is the same as or associated with a layout of the wallpaper upper-layer elements included in the last frame of AOD interface of the screen-off phase. Therefore, when the terminal enters the screen locked interface from the AOD interface, presentation of the background wallpaper seems to be continuous or coherent, and presentation of the wallpaper upper-layer elements seems to be continuous or coherent. For example, the wallpaper upper-layer elements included in the last frame of AOD interface of the screen-off phase include time and a date, and the wallpaper upper-layer elements included in the first frame of screen locked interface of the screen locking stage include time and a date. For example, for the time and the date that are included in the screen locked interface and the time and the date that are included in the AOD interface, display sizes, display positions, relative position relationships, display colors, and the like of the times and the dates that are included in the two interfaces are the same; or display sizes and display positions of the times and the dates that are included in the two interfaces are similar, not completely the same, and display colors may be the same or different.

Figure 4:
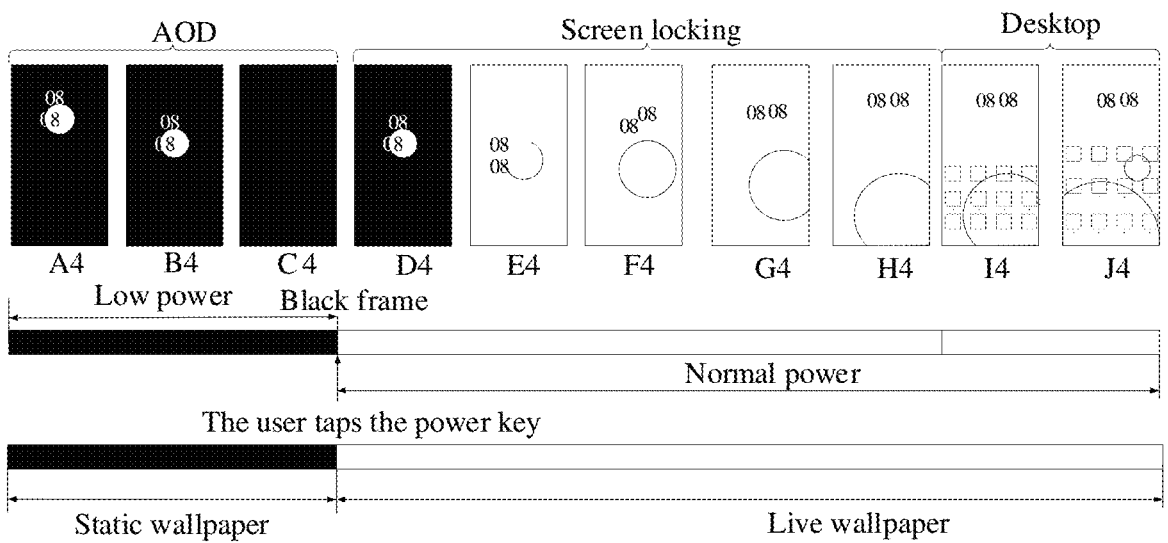
FIG. 4 is a schematic diagram of displaying another interface according to an embodiment of this application.

For example, the background wallpaper of the screen locking stage is a live wallpaper. For example, as shown in FIG. 4, the interfaces A4 to C4 are interfaces displayed when the screen of the terminal is powered off, and the interfaces D4 to J4 are interfaces displayed when the screen of the terminal is powered on. The interfaces A4 and B4 are AOD interfaces; the interface C4 is a black frame; the interfaces D4 to H4 are screen locked interfaces; and the interfaces I4 and J4 are desktops. For example, when the interface B4 is displayed on the display screen of the terminal, if the user taps the power key, in response to the operation of tapping the power key by the user, the terminal exits AOD, triggers playing of the live wallpaper, powers on the display screen, and enters the screen locked interface, that is, the screen locked interface and the live wallpaper are displayed on the display screen. In this way, the terminal may present a played image of the live wallpaper to the user when entering the screen locked interface. For example, the live wallpaper is displayed under the screen locked interface, so as to prevent the live wallpaper from covering contents on the screen locked interface, for example, wallpaper upper-layer elements such as time and a date.

Specifically, in response to the operation of tapping the power key by the user, the terminal exits the AOD, is switched from the microprocessor to the processor, triggers, after being switched to the processor, playing of the live wallpaper, powers on the display screen, and displays the screen locked interface and the live wallpaper on the display screen. A picture played by the live wallpaper when the terminal displays the first frame of screen locked interface in the screen locking stage is the same as or associated with the background wallpaper included in the last frame of AOD interface in the screen-off stage. For example, if the first frame of screen locked interface displayed by the terminal in the screen locking stage is the interface D4, and the last frame of AOD interface displayed by the terminal in the screen-off stage is the interface B4, a picture played by the live wallpaper when the terminal displays the interface D4 is the same as or associated with the background wallpaper included in the interface B4. It should be noted that in the process of switching the terminal from the microprocessor to the processor, the terminal displays a black frame, such as the interface C4, on the display screen. For example, when it takes about 260 ms to 300 ms to realize switching from the microprocessor to the processor, a duration for the terminal to display a black frame on the display screen is 260 ms to 300 ms. It should be noted that a duration required for switching from the microprocessor to the processor is related to a device processing capability of the terminal. Terminals with different device processing capabilities have different durations required for switching from a microprocessor to a processor. A higher processing capability of a terminal indicates a shorter duration required for switching from a microprocessor to a processor.

Further, when the terminal displays the interface H4, if the user unlocks the terminal (for example, the user slides upward on the interface H4, or by using a password, a fingerprint, or facial recognition), the terminal exits the screen locked interface in response to the unlock operation performed by the user on the terminal, and displays a desktop on the display screen. The desktop includes a background wallpaper and wallpaper upper-layer elements (such as icons of application programs, time, dates, and widgets), for example, the interface 14 and the interface J4. When the background wallpaper included in the desktop is a live wallpaper, after the terminal is unlocked, that is, when the desktop is displayed, the live wallpaper continues to be played from where the playing of the live wallpaper is stopped when the terminal exits the screen locked interface. Therefore, the background wallpaper seems to be dynamically and continuously played from the AOD interface to the screen locked interface and from the screen locked interface to the desktop. Or, if the background wallpaper included in the desktop is a static wallpaper, after the terminal is unlocked, when the desktop is displayed, the static wallpaper included in the desktop is the same as or associated with the background wallpaper when the terminal displays the last frame of screen locked interface in the screen locking stage, so that a dynamic effect of the background wallpaper seems to be continuous or coherent from the screen locked interface to the desktop.

It should be noted that when the background wallpaper of the screen locking stage is a live wallpaper, the background wallpaper when the terminal displays the last frame of screen locked interface in the screen locking stage may be understood as a picture played by the live wallpaper when the terminal displays the last frame of screen locked interface in the screen locking stage For example, the live wallpaper of the screen locking stage includes ten frames of pictures, that is, a picture 1 to a picture 10. When the terminal displays the last frame of screen locked interface in the screen locking stage, if the live wallpaper is played to the picture 8, the background wallpaper when the terminal displays the last frame of screen locked interface in the screen locking stage is the picture 8. Or, when the terminal displays the last frame of screen locked interface in the screen locking stage, if playing of the live wallpaper ends, the background wallpaper when the terminal displays the last frame of screen locked interface in the screen locking stage is the last frame of picture of the live wallpaper of the screen locking stage. For example, the live wallpaper of the screen locking stage includes ten frames of pictures, that is, a picture 1 to a picture 10. If the terminal sequentially plays the pictures according to an order from the picture 1 to the picture 10 in the screen locking stage, the last frame of picture of the live wallpaper of the screen locking stage is the picture 10. If the terminal plays the pictures according to an order from the picture 10 to the picture 1 in the screen locking stage, the last frame of picture of the live wallpaper of the screen locking stage is the picture 1.

When the background wallpaper of the screen locking stage and the background wallpaper displayed after unlocking are live background wallpapers, after the terminal enters the screen locked interface and the desktop, the live wallpapers may be presented to the user and played, but power consumption is normal.

Figure 5:
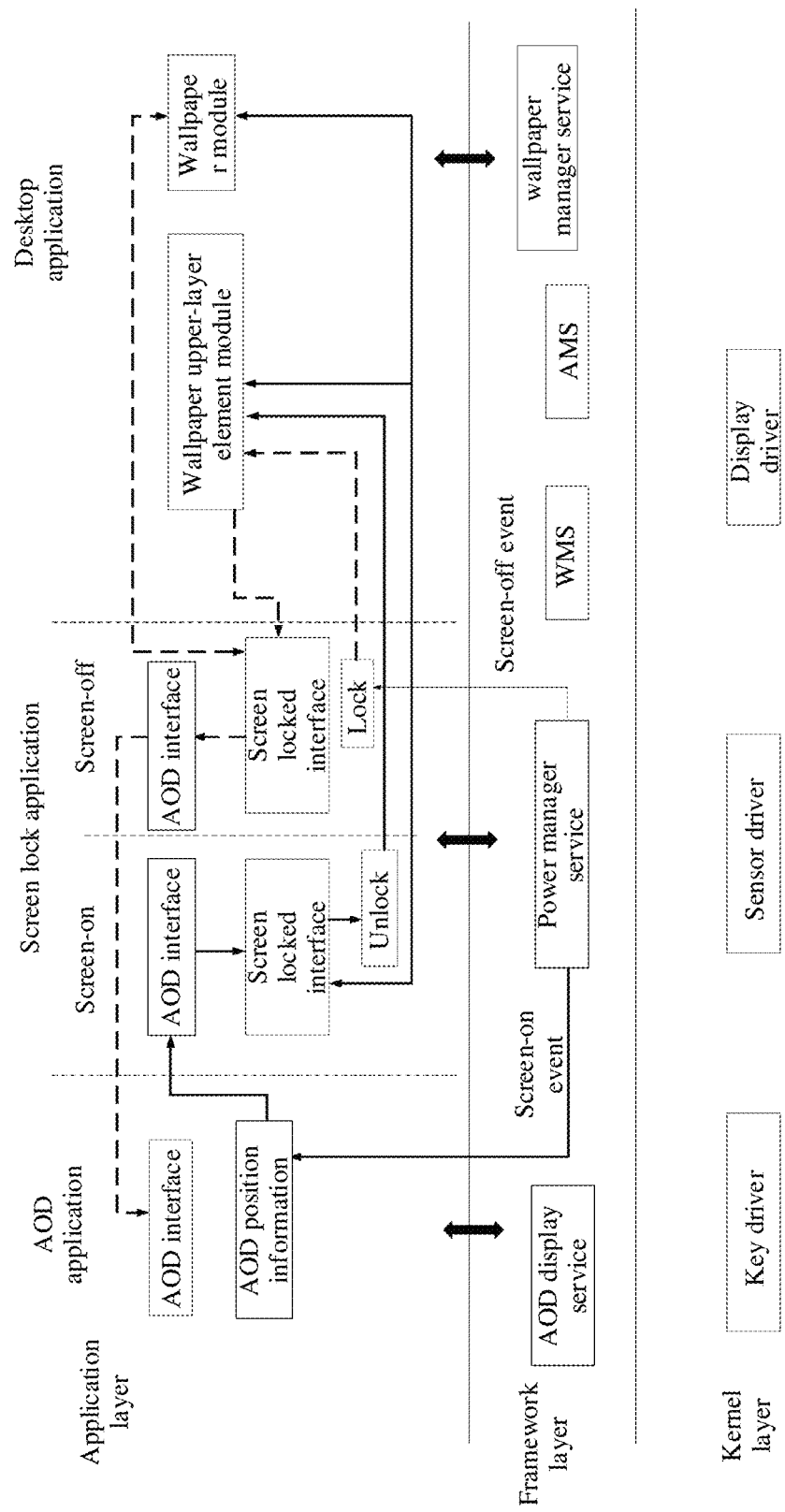
FIG. 5 is a schematic diagram of a software structure of a terminal according to an embodiment of this application.

A software architecture of the terminal in this embodiment of this application will be introduced below. The software architecture of the terminal in this embodiment of this application may be a layered architecture, an event-driven architecture, a microkernel architecture, a microservice architecture, a cloud architecture, or the like. For example, that the software architecture of the terminal may be an architecture of an Android® operating system is taken as an example. As shown in FIG. 5, the software architecture of the terminal is divided into three layers: an application layer, a frame layer, and a kernel layer from top to bottom.

The application layer includes application programs such as an AOD application, a screen lock application, and a desktop application. The desktop application may include a wallpaper module and a wallpaper upper-layer element module. In this embodiment of this application, the wallpaper module may be classified into a static wallpaper module and a live wallpaper module. The wallpaper upper-layer element module may be configured to manage displaying of wallpaper upper-layer elements, such as application program icons, time, a power consumption icon, an operator icon, or a widget (widget).

The frame layer may include an AOD display service, a power manager service, a windows manager service (windows manager service, WMS), an activity manager service (activity manager service, AMS), a wallpaper manager service, and the like.

The AOD display service is used for controlling a position and contents of a screen-on region of the AOD interface.

The power manager service is used for controlling power of a device, and triggering screen powering on (for example, displaying the screen locked interface) or screen powering off (for example, displaying the AOD interface). For example, after receiving an operation of tapping the power key by the user, the power manager service in the frame layer determines that the operation of tapping the power key by the user is a screen-on event, and indicates the screen-on event to the AOD application in the application layer. After receiving the indication of the screen-on event, the AOD application obtains current AOD position information from the AOD display service in the frame layer. The current AOD position information is used for indicating a position of a screen-on region of the last frame of AOD interface of the screen-off stage before the screen locked interface is switched to in response to the screen-on event.

The wallpaper manager service is used for controlling switching of the background wallpaper between the screen lock application and the desktop application, and controlling a time period of displaying of the live wallpaper at the screen lock application and the desktop application.

The WMS is used for windows management. For example, the WMS is used for managing displaying of the wallpaper upper-layer elements, such as the wallpaper upper-layer elements included in the desktop.

The AMS is used for managing processes of application programs.

The kernel layer is a layer located between hardware and software, and includes at least a key driver, a sensor driver, a display driver, and the like.

In addition, in some embodiments, the software architecture of the terminal may further include an Android runtime (Android runtime) and a system library. The Android runtime and the system library are located between the frame layer and the kernel layer. The Android runtime schedules and manages an Android operating system. The Android runtime includes a kernel library and a virtual machine. The system library may include a plurality of functional modules, such as a surface manager (surface manager), media libraries (media libraries), a three-dimensional graphics processing library (for example, openGL FS), and a 2D graphics engine.

An interface display method of this embodiment of this application will be specifically introduced below in combination with a software structure of the terminal shown in FIG. 5.

Embodiment I: The following events are taken as an example: The terminal is switched from an AOD interface to a screen locked interface and then switched from the screen locked interface to a desktop or an interface of an application program; a background wallpaper of a screen-off stage is a static wallpaper, and a background wallpaper of a screen locking stage and a background wallpaper displayed after unlocking are live background wallpapers.

As shown in FIG. 6A, an interface A6 is an AOD interface, and the AOD interface includes prompt information such as time, a date and a remaining electric quantity, and a static wallpaper. An interface B6 is a black frame. Interfaces C6 and D6 are screen locked interfaces with live wallpapers. An interface E is a desktop. An interface F is an interface of an address book.

For example, when the screen of the terminal is powered off, the interface A6 is displayed on the display screen. When the terminal displays the interface A6 on the display screen, if the user taps the power key 6, in response to the operation of tapping the power key 6 by the user, the terminal exits the AOD, and prepares to power on the display screen. In the process of preparing to power on the display screen, the terminal may display the interface B6 on the display screen. After the preparation to power on the display screen ends, the terminal triggers playing of the live wallpaper of the screen locking stage, and displays the screen locked interface and the live wallpaper on the display screen. In this case, the interface A6 is a last frame of AOD interface of the screen-off stage. Specifically, the static wallpaper included in the last frame of AOD interface of the screen-off stage may be the same as or associated with a first frame of picture of the live wallpaper when the terminal displays a first frame of screen locked interface in the screen locking stage. Therefore, a dynamic effect of the background wallpaper seems to be continuous or coherent during the switching from the AOD interface to the screen locked interface. For example, when the terminal displays the first frame of screen locked interface in the screen locking stage, an interface obtained after the screen locked interface and the live wallpaper are superimposed is the interface C6, and the background wallpaper included in the interface C6 is the first frame of picture of the live wallpaper of the screen locking stage and is the same as the background wallpaper included in the interface A6. Further, in some embodiments, a layout of the wallpaper upper-layer elements included in the first frame of screen locked interface of the screen locking stage is the same as or associated with a layout of the wallpaper upper-layer elements included in the last frame of AOD interface of the screen-off phase. Therefore, the presentation of the wallpaper upper-layer elements seems to be continuous or coherent during the switching from the AOD interface to the screen locked interface.

For example, after the terminal exits the AOD, the switching from the microprocessor to the processor is involved in the process of preparing to power on the display screen, and a duration for the terminal to display a black frame on the display screen is related to a duration required for the switching from the microprocessor to the processor. For example, if a duration required for the switching from the microprocessor to the processor is 260 ms to 300 ms, a duration for the terminal to display a black frame on the display screen is 260 ms to 300 ms, or a duration for the terminal to display a black frame on the display screen is slightly longer than the duration required for the switching from the microprocessor to the processor.

Further, when the terminal displays the interface D6, if the user unlocks the terminal, the terminal may exit the displaying of the screen locked interface in response to the unlock operation performed by the user on the terminal, and display a desktop on the display screen. The desktop includes wallpaper upper-layer elements and a live wallpaper. When the terminal displays the desktop, the live wallpaper may start to be played from where the playing of the live wallpaper is stopped when the terminal exits the screen locked interface. In addition, the playing of the live wallpaper ends when the last frame is played. If the last frame of picture of the live wallpaper is played, the live wallpaper will be no longer played. When the terminal continues to display the desktop on the display screen, the last frame of picture of the live wallpaper is continuously displayed as the background wallpaper of the desktop, thereby achieving an objective of saving power consumption. For example, that the live wallpaper includes a picture 1 to a picture 15 is taken as an example. The live wallpaper of the screen locking stage includes the picture 1 to the picture 10, and the background wallpaper displayed after unlocking includes the picture 11 to the picture 15. If the live wallpaper of the screen locking stage is played to the picture 10 when the terminal exits the displaying of the screen locked interface, that is, when the last frame of screen locked interface of the screen locking stage is displayed, the terminal is unlocked. When the terminal displays the desktop, the live wallpaper starts to be continuously played from the picture 11. After the live wallpaper is played to the picture 15, the terminal ends the playing of the live wallpaper. If the terminal continues to display the desktop, the picture 15 is continuously displayed as the background wallpaper of the desktop. It should be understood that contents presented by the picture 1 to the picture 15 are associated, and may form an animation effect. The picture 10 and the picture 11 are associated with each other, so that a dynamic effect of the background wallpaper seems to be continuous or coherent in switching from the screen locked interface to the desktop.

Figure 6B:
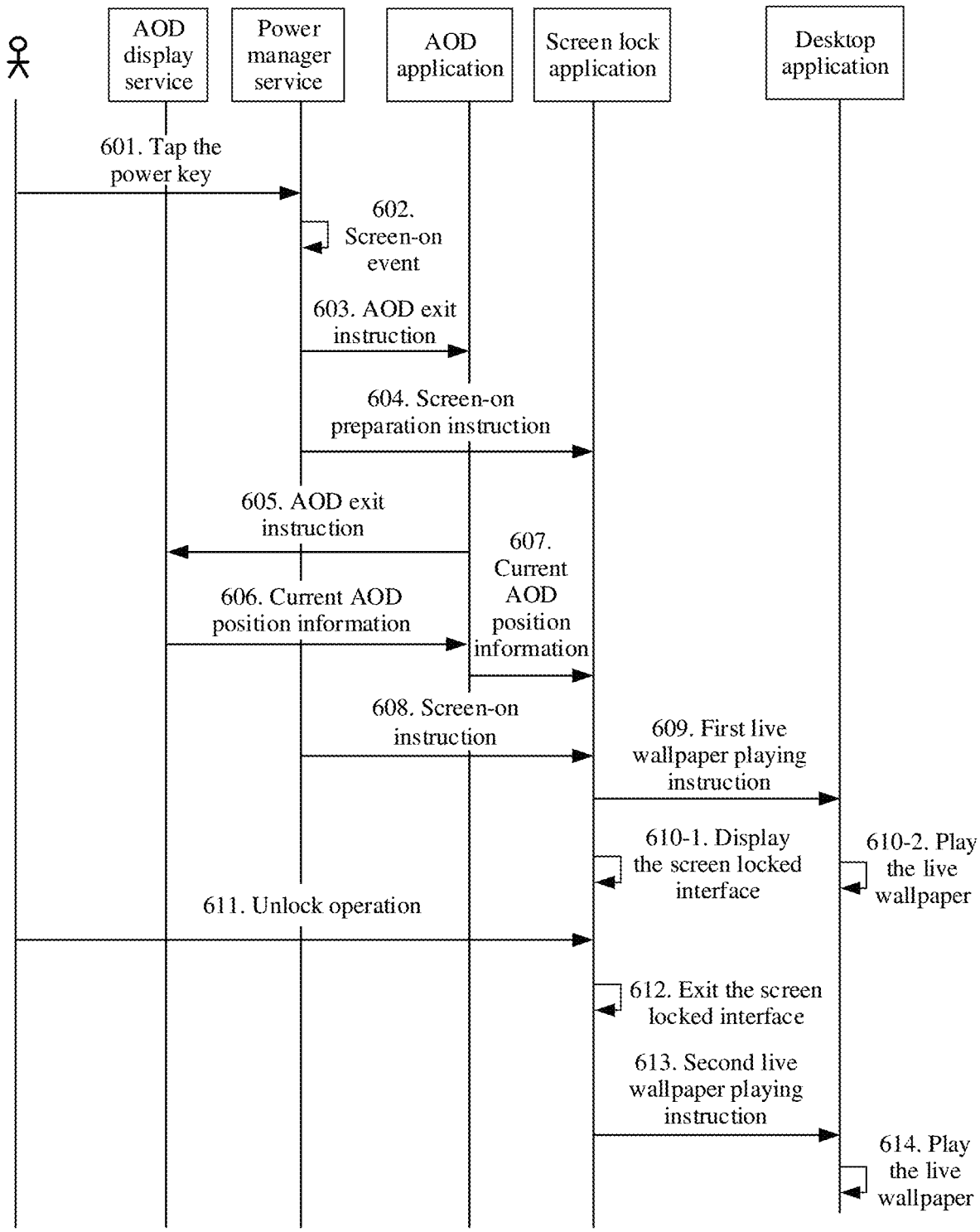
FIG. 6B is a flowchart of an interface display method according to an embodiment of this application.

For example, when the terminal enters the screen locked interface from the AOD interface and then enters the desktop from the screen locked interface, a flow of the interface display method may be as shown in FIG. 6B, and specifically includes the following steps.

601. The key driver detects an event that the user taps the power key, and sends an indication of the event that the user taps the power key to the power manager service.

602. When the screen of the terminal is powered off, the power manager service determines, after receiving the indication of the event that the user taps the power key, that the event that the user taps the power key is used for triggering a screen-on event.

603. The power manager service sends an AOD exit instruction to the AOD application.

604. The power manager service sends a screen-on preparation instruction to a screen lock application.

605. After receiving the AOD exit instruction, the AOD application sends the AOD exit instruction to the AOD display service.

606. After receiving the AOD exit instruction, the AOD display service sends the current AOD position information to the AOD application.

The current AOD position information is used for indicating a position of a screen-on region of the last frame of AOD interface of the screen-off stage before the screen locked interface is switched to in response to the screen-on event. For example, when the last frame of AOD interface includes the background wallpaper and the wallpaper upper-layer elements, the position of the screen-on region may include a position of the background wallpaper included in the last frame of AOD interface and a display position of the wallpaper upper-layer elements.

607. After receiving the current AOD position information, the AOD application exits the AOD, and sends the current AOD position information to the screen lock application. It should be noted that when the AOD application exits the AOD, before the display screen is powered on, a black frame may be displayed on the display screen, that is, a black screen is presented to the user.

For example, the AOD application exits the AOD. In the process of preparing to power on the display screen before powering on the display screen, the switching from the microprocessor to the processor may be involved. Therefore, in this period, the terminal displays a black frame on the display screen, and presents a black screen to the user.

608. The power manager service sends a screen-on instruction to the screen lock application.

609. After receiving the screen-on instruction, the screen lock application sends a first live wallpaper playing instruction to the desktop application. For example, the first live wallpaper playing instruction is used for indicating the desktop application to play the live wallpaper of the screen locking stage. It should be noted that in a case of switching from the AOD interface to the screen locked interface, the live wallpaper of the screen locking stage refers to a live wallpaper from the AOD stage to the screen locking stage.

For example, after receiving the screen-on instruction, the screen lock application sends the first live wallpaper playing instruction to the wallpaper module of the desktop application.

610-1. The screen lock application displays the screen locked interface on the display screen.

610-2: After receiving the first live wallpaper playing instruction, the desktop application plays the live wallpaper according to the first live wallpaper playing instruction, and displays the live wallpaper on the display screen.

The static wallpaper included in the last frame of AOD interface of the screen-off stage is the same as or associated with a first frame of picture of the live wallpaper when the terminal displays a first frame of screen locked interface in the screen locking stage. A reference may be made to the foregoing related descriptions for details which are not described herein again.

There is no necessary order between steps 610-1 and 610-2. For example, steps 610-1 and 610-2 may be performed simultaneously.

611. The screen lock application receives an indication of an event that the user performs an unlock operation.

612. The screen lock application exits the displaying of the screen locked interface.

613. The screen lock application sends a second live wallpaper playing instruction to the desktop. For example, the second live wallpaper playing instruction is used for indicating a live wallpaper displayed after unlocking. It should be noted that in a case of switching from the screen locked interface to the desktop, the live wallpaper displayed after unlocking refers to a live wallpaper from the screen locking stage to the desktop stage.

For example, the screen lock application sends the second live wallpaper playing instruction to the wallpaper module of the desktop application.

The last frame of picture of the live wallpaper from the AOD stage to the screen locking stage is associated with the first frame of picture of the live wallpaper from the screen locking stage to the desktop stage. A dynamic effect presented by the live wallpaper to the user is continuous or coherent when the terminal enters the desktop from the screen locked interface.

614. After receiving the second live wallpaper playing instruction, the desktop application plays the live wallpaper according to the second live wallpaper playing instruction, and displays the live wallpaper and the wallpaper upper-layer elements on the display screen, thus achieving switching from the screen locked interface to the desktop.

For example, the live wallpapers from the AOD stage to the screen locking stage and from the screen locking stage to the desktop stage are continuous. Further, the live wallpaper may play a corresponding live wallpaper with reference to a moment at which the playing of the live wallpaper from the AOD stage to the screen locking stage stops and a playing instruction of the live wallpaper from the screen locking stage to the desktop stage, so as to implement connection of the live wallpapers played in different interface display stages. Therefore, when seen with eyes, the live wallpapers appear to be coherent when the terminal is switched from the screen locked interface to the desktop. That the live wallpaper includes 20 frames of pictures including a picture 1 to a picture 20 is taken as an example. The live wallpaper from the AOD stage to the screen locking stage includes the picture 1 to the picture 10, and the live wallpaper from the screen locking stage to the desktop stage includes the picture 11 to the picture 20. In the screen locking stage, the terminal plays the picture 1 to the picture 10 in sequence. After being unlocked, the terminal plays the picture 11 to the picture 20 in sequence. If the live wallpaper from the AOD stage to the screen locking stage is played to the picture 5 when the terminal displays the last frame of screen locked interface in the screen locking stage, the terminal is unlocked. After the terminal enters the desktop, the playing starts from the picture 6 to the picture 20. In this case, after entering the desktop, the terminal may accelerate the playing of the live wallpaper, so that a duration required by the terminal to play the picture 6 to the picture 20 is the same as a duration required by the terminal to play the picture 11 to the picture 20 at a normal speed, thereby achieving an objective of reducing the power consumption of the terminal.

In some other embodiments, the terminal may further display an interface of an application program on the display screen in response to the unlock operation of the user, for example, the interface F6 as shown in FIG. 6A. For example, when the terminal displays the interface F6, if the user taps the power key, the screen of the terminal is powered off in response to the operation of tapping the power key by the user, and the AOD interface is displayed on the display screen. In this case, if the user taps, when the terminal displays the AOD interface, the power key to enter the screen locked interface, the terminal exits, after being unlocked, the displaying of the screen locked interface, displays the interface F6 on the display screen, and stops playing the live wallpaper.

In addition, it should be noted that the static background wallpaper at the screen-off stage may be further replaced with a live background wallpaper at the screen-off stage. In this case, the background wallpaper included in the last frame of AOD interface of the screen-off stage is the same as or associated with a first frame of picture of the live wallpaper when the terminal displays a first frame of screen locked interface in the screen locking stage. The background wallpaper included in the last frame of AOD interface of the screen-off stage may be understood as a picture played by the live wallpaper included in the AOD interface when the terminal displays the last frame of AOD interface in the screen-off stage. For example, that the live wallpaper included in the AOD interface includes a picture 1 to a picture 5 is taken as an example. When the terminal displays the last frame of AOD interface in the screen-off stage, if the live wallpaper is played to the picture 5, the background wallpaper included in the last frame of AOD interface of the screen-off stage is the picture 5.

Or, a live background wallpaper displayed after unlocking (that is, the background wallpaper from the screen locking stage to the desktop stage) may be replaced with a static background wallpaper displayed after unlocking (that is, the background wallpaper from the screen locking stage to the desktop stage). In this case, the last frame of picture of the live wallpaper from the AOD stage to the screen locking stage is associated with or the same as the static wallpaper from the screen locking stage to the desktop stage.

Embodiment II: The following events are taken as an example: The terminal is switched from an AOD interface to a desktop; a background wallpaper of a screen-off stage is a static wallpaper, and a background wallpaper of a screen locking stage and a background wallpaper displayed after unlocking are live background wallpapers.

Figure 7A:
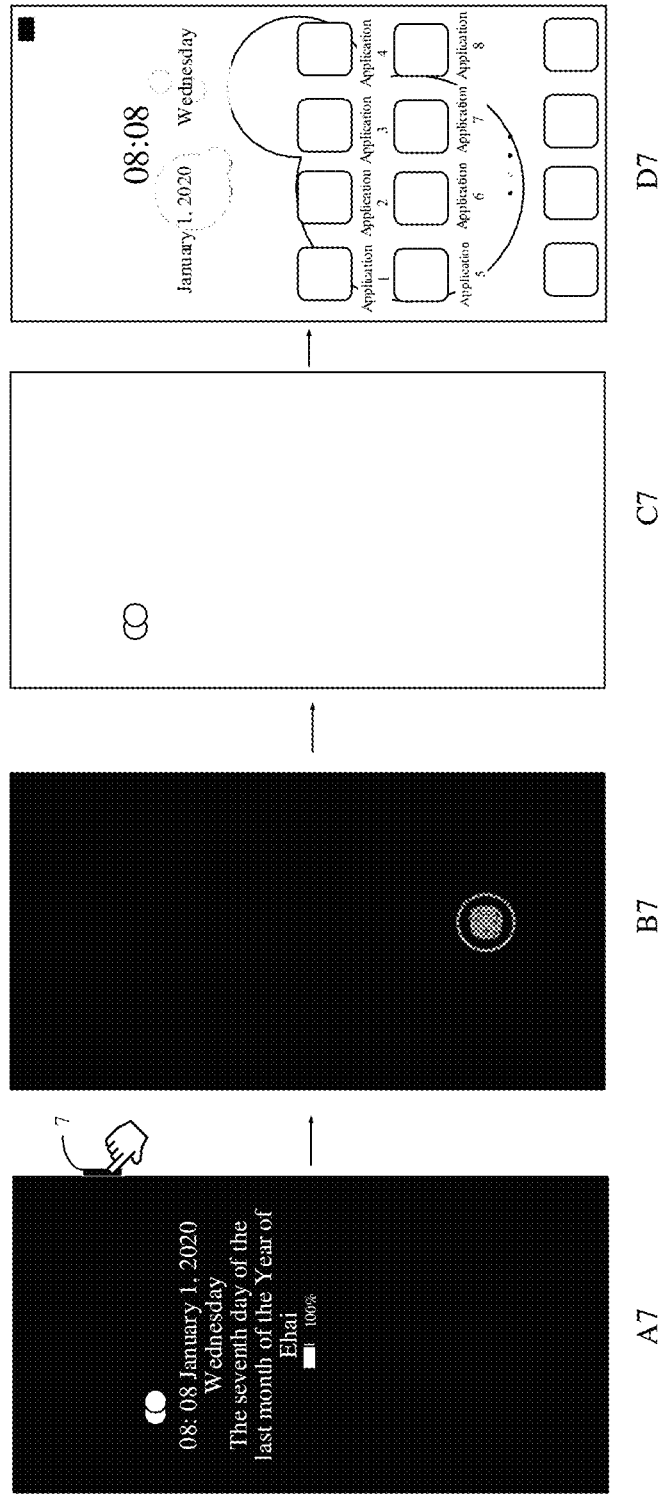
FIG. 7A is a schematic diagram of displaying another interface according to an embodiment of this application.

As shown in FIG. 7A, an interface A7 is an AOD interface, and the AOD interface includes prompt information such as time, a date and a remaining electric quantity, and a static wallpaper. An interface B7 is a fingerprint unlock interface. An interface C7 and an interface D7 are desktops.

When the screen of the terminal is powered off, the AOD screen is displayed on the display screen. That the interface A7 is used as the AOD interface is taken as an example. For example, when the interface A7 is displayed on the display screen, if the user taps the power key 7, in response to the operation of tapping the power key 7 by the user, the terminal exits the AOD, powers on the display screen, and displays the screen locked interface on the display screen. For example, that the interface B7 is used as the screen locked interface is taken as an example. After fingerprint verification of the user succeeds, the terminal triggers playing of the live wallpaper, and displays the desktop on the display screen. The desktop includes wallpaper upper-layer elements and a live wallpaper. The static wallpaper included in the last frame of AOD interface of the screen-off stage is the same as or associated with the background wallpaper when the terminal displays, after being unlocked, the first frame of desktop. For example, after the terminal is unlocked, the first frame of desktop displayed by the terminal may not include the wallpaper upper-layer elements. Starting from a second frame, the desktop of the terminal includes the wallpaper upper-layer elements, that is, the user may watch the wallpaper upper-layer elements on the display screen, for example, application program icons. It should be noted that, the background wallpaper when the terminal displays the first frame of desktop after being unlocked may be understood as the first frame of picture of the live wallpaper displayed after unlocking, that is, the first frame of picture of the live wallpaper from the AOD stage to the desktop stage. For example, the live wallpaper displayed after unlocking includes 20 frames of pictures which include a picture 1 to a picture 20. After being unlocked, the terminal starts to play the pictures from the picture 1 according to an order from the picture 1 to the picture 20, so the first frame of picture of the live wallpaper displayed after unlocking is the picture 1. Or, after being unlocked, the terminal starts to play the pictures from the picture 20 according to an order from the picture 20 to the picture 1, so the first frame of picture of the live wallpaper displayed after unlocking is the picture 20.

It should be understood that if the user taps the power key 7 when the interface A7 is displayed on the display screen, the interface A7 is the last frame of AOD interface of the screen-off stage, or is the AOD interface displayed when the terminal exits the AOD. The first frame of desktop displayed on the display screen in response to the operation of tapping the power key 7 by the user may be the interface C7.

Since the terminal directly enters the desktop from the AOD interface, the live wallpaper that needs to be played from the AOD stage to the screen locking stage in Embodiment I may be played when the terminal displays the desktop, and after the playing is completed, the live wallpaper from the screen locking stage to the desktop stage continues to be played. Further, in some embodiments, the terminal may accelerate the playing of the live wallpaper from the AOD stage to the desktop stage, so as to reduce the power consumption of the terminal. For example, a duration required by the terminal to play the live wallpaper from the AOD stage to the screen locking stage and the live wallpaper from the screen locking stage to the desktop stage is shortened to be the same as a duration required by the terminal to play only the live wallpaper from the screen locking stage to the desktop stage.

Figure 7B:
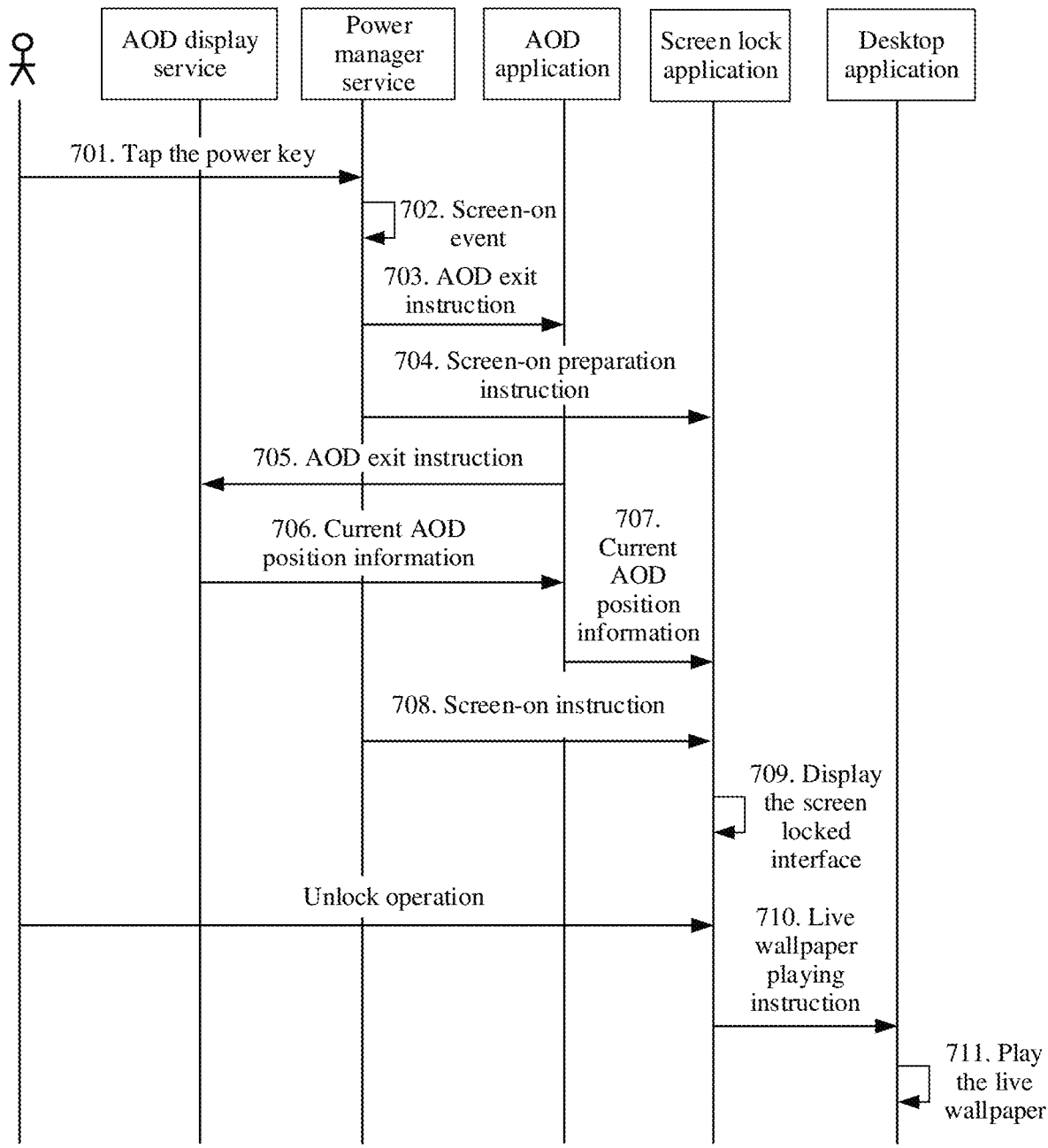
FIG. 7B is a flowchart of another interface display method according to an embodiment of this application.

For example, when the terminal directly enters the desktop from the AOD interface, a flow of the interface display method may be as shown in FIG. 7B, and specifically includes the following steps.

701. The key driver detects an event that the user taps the power key, and sends an indication of the event that the user taps the power key to the power manager service.

702. When the screen of the terminal is powered off, the power manager service determines, after receiving the indication of the event that the user taps the power key, that the event that the user taps the power key is used for triggering a screen-on event.

703. The power manager service sends an AOD exit instruction to the AOD application.

704. The power manager service sends a screen-on preparation instruction to screen locking.

705. After receiving the AOD exit instruction, the AOD application sends the AOD exit instruction to the AOD display service.

706. After receiving the AOD exit instruction, the AOD display service sends the current AOD position information to the AOD application.

The current AOD position information is used for indicating a position of a screen-on region of the last frame of AOD interface of the screen-off stage before the display screen is powered on in response to the screen-on event.

707. After receiving the current AOD position information, the AOD application exits the AOD, and sends the current AOD position information to the screen lock application. It should be noted that the AOD application exits the AOD. Before the display screen is powered on, a black frame is displayed on the display screen, that is, the black frame is presented to the user.

For example, the AOD application exits the AOD. In the process of preparing to power on the display screen before powering on the display screen, the switching from the microprocessor to the processor may be involved. Therefore, in this period, the terminal will display a black frame on the display screen, and presents the black screen to the user.

708. The power manager service sends a screen-on instruction to the screen lock application.

709. The screen lock application receives the screen-on instruction, and triggers displaying of the screen locked interface on the display screen. The screen locked interface is used by the user to unlock the terminal, for example, the interface B7.

It should be noted that in this embodiment of this application, the screen locked interface used by the user to unlock the terminal may be a face unlocking interface, a password unlocking interface, or the like. This is not limited.

710. After receiving an event that the user performs an unlock operation, the screen lock application sends a live wallpaper playing instruction to the desktop application if unlocking verification succeeds. The live wallpaper playing instruction is used for indicating the desktop to play a live wallpaper from the AOD stage to the desktop stage, and the live wallpaper playing instruction includes current AOD position information.

For example, the screen lock application sends the live wallpaper playing instruction to the wallpaper module of the desktop application.

711. After receiving the live wallpaper playing instruction, the desktop application plays the live wallpaper according to the live wallpaper playing instruction, and displays the desktop on the display screen. The static wallpaper included in the last frame of AOD interface of the screen-off stage is the same as or associated with the background wallpaper when the terminal displays, after being unlocked, the first frame of desktop. Therefore, a dynamic effect of the background wallpaper seems to be continuous or coherent during from the AOD interface to the desktop.

For example, the desktop can speed up the playing of live wallpaper from the AOD stage to the desktop stage.

It should be noted that in some embodiments, if the terminal displays an interface of an application program on the display screen after the unlocking verification performed by the user succeeds, playing of a live wallpaper will not be triggered.

In addition, it should be further noted that in a scenario where the terminal directly enters the desktop from the AOD interface, the background wallpaper included in the AOD interface can also be a live wallpaper. In this case, the background wallpaper included in the last frame of AOD interface of the screen-off stage is the same as or associated with the background wallpaper when the terminal displays, after being unlocked, the first frame of desktop. For related descriptions of the background wallpaper included in the last frame of AOD interface of the screen-off stage, a reference may be made to the related descriptions in Embodiment I.

Embodiment III: The following events are taken as an example: The terminal is switched from a screen locked interface to an AOD interface; a background wallpaper of a screen-off stage is a static wallpaper, and a background wallpaper of a screen locking stage and a background wallpaper displayed after unlocking are live background wallpapers.

Figure 8A:
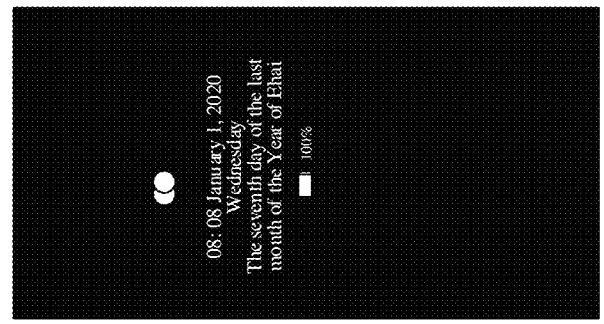
FIG. 8A is a schematic diagram of displaying another interface according to an embodiment of this application.
Figure 8A:
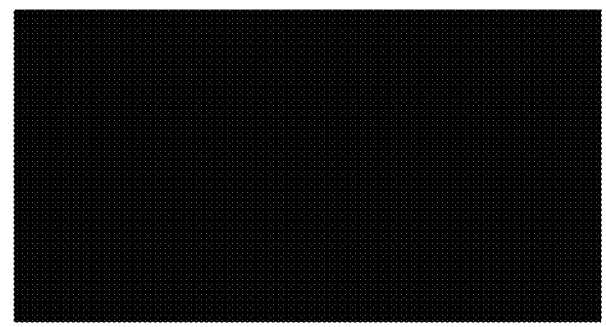
Figure 8A:
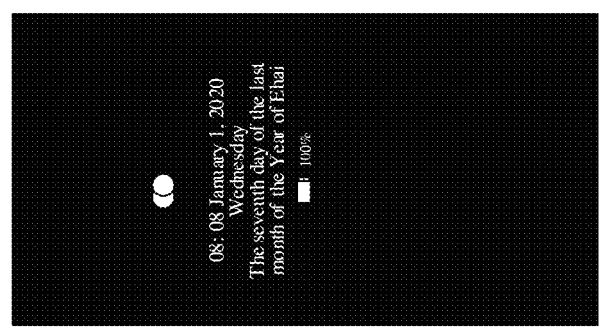
Figure 8A:
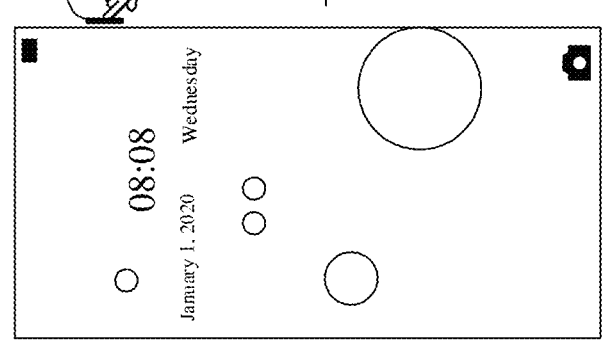

As shown in FIG. 8A, interfaces A8 and B8 are screen locked interfaces with live wallpapers. An interface C8 is a black frame. An interface D8 is an AOD interface.

When the screen of the terminal is locked, the screen locked interface is displayed on the display screen. For example, when the terminal displays the interface A8 on the display screen, if the user taps the power key 8, in response to an operation of tapping the power key 8 by the user, the terminal triggers playing of a live wallpaper from the screen locking stage to the AOD stage. After playing of the live wallpaper from the screen locking stage to the AOD stage ends, the terminal exits the displaying of the screen locked interface, and displays the AOD interface on the display screen, such as the interface D8. The last frame of picture of the live wallpaper from the screen locking stage to AOD stage is the same as or associated with the background wallpaper included in the first frame of AOD interface of the screen-off stage after the terminal exits the displaying of the screen locked interface. In this embodiment of this application, the last frame of picture of the live wallpaper from the screen locking stage to the AOD stage may be understood as a picture played by the live wallpaper when the terminal displays the last frame of screen locked interface in the screen locking stage. Further, in some embodiments, a layout of wallpaper upper-layer elements included in the last frame of screen locked interface of the screen locking stage is the same as or associated with a layout of wallpaper upper-layer elements included in the first frame of desktop.

When the last frame of picture of the live wallpaper from the screen locking stage to the AOD stage is the same as the background wallpaper included in the first frame of AOD interface of the screen-off stage, and the layout of the wallpaper upper-layer elements included in the last frame of screen locked interface of the screen locking stage is the same as the layout of the wallpaper upper-layer elements included in the first frame of desktop, if the screen locked interface included in the interface B8 is the last frame of screen locked interface of the screen locking stage, the interface D8 is the first frame of desktop, that is, the interface B8 is the same as the interface D8. Therefore, a dynamic effect of the background wallpaper seems to be continuous or coherent during the switching of the terminal from the screen locked interface to the AOD interface.

In addition, after the terminal exits the displaying of the screen locked interface, and before the AOD interface is displayed on the display screen, switching from the processor to the microprocessor and a process of preparing to display the AOD interface will be involved. Therefore, the terminal will display a black frame on the display screen during this period, for example, the interface C8. For example, after the terminal exits the displaying of the screen locked interface and displays the AOD interface, a duration of presenting the black screen to the user may be 260 ms to 300 ms.

Figure 8B:
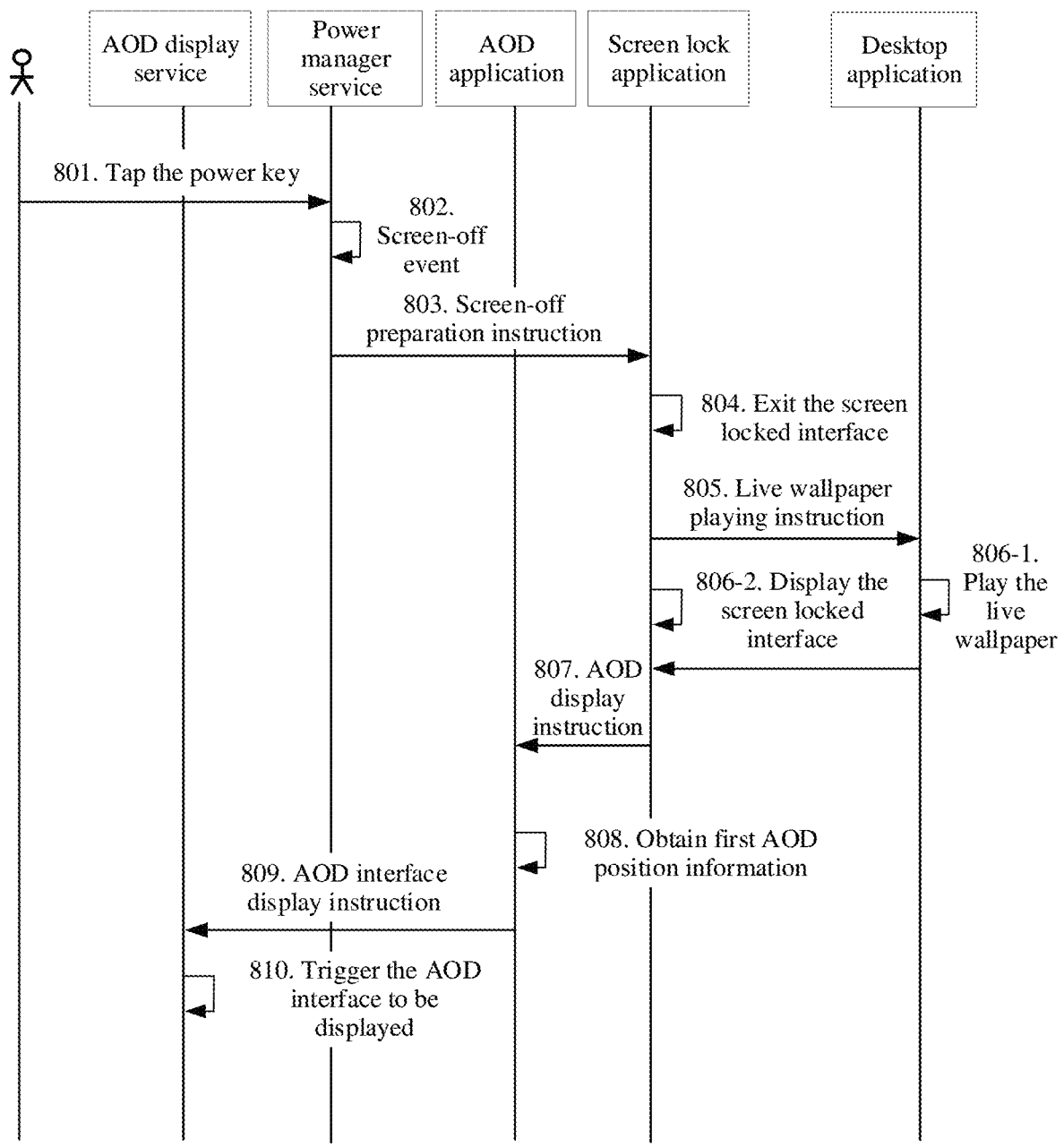
FIG. 8B is a flowchart of another interface display method according to an embodiment of this application.

For example, when the terminal enters the AOD interface from the screen locked interface, a flow of the interface display method may be as shown in FIG. 8B, and specifically includes the following steps.

801. The key driver detects an event that the user taps the power key, and sends an indication of the event that the user taps the power key to the power manager service.

802. When the screen of the terminal is powered off, the power manager service determines, after receiving the indication of the event that the user taps the power key, that the event that the user taps the power key is used for triggering a screen-off event.

803. The power manager service sends a screen-off preparation instruction to the screen lock application.

804. The screen lock application receives the screen-off preparation instruction, and exits or fades out of the displaying of the screen locked interface.

805. The screen lock application sends a first live wallpaper playing instruction to the desktop application. For example, the first live wallpaper playing instruction is used for indicating the desktop application to play the live wallpaper from the AOD stage to the screen locking stage in a reverse order, or the first live wallpaper playing instruction is used for indicating the desktop application to play the live wallpaper from the screen locking stage to the AOD stage.

It should be noted that a dynamic effect of the live wallpaper from the screen locking stage to the AOD stage and a dynamic effect of the live wallpaper from the AOD stage to the screen locking stage are opposite in timing. That the live wallpaper includes ten frames of pictures, which are respectively a picture 1 to a picture 10, is taken as an example. The live wallpaper from the screen locking stage to the AOD stage starts to be played from the picture 10 according to an order from the picture 10 to the picture 1. The live wallpaper from the AOD stage to the screen locking stage starts to be played from the picture 1 according to an order from the picture 1 to the picture 10.

For example, the screen lock application sends the first live wallpaper playing instruction to the wallpaper module of the desktop application.

806-1: After receiving the first live wallpaper playing instruction, the desktop application plays the live wallpaper according to the first live wallpaper playing instruction, and displays the live wallpaper on the display screen. For example, the desktop application plays the live wallpaper from the AOD stage to the screen locking stage in a reverse order according to the first live wallpaper playing instruction.

806-2. The screen lock application displays the screen locked interface.

The last frame of picture of the live wallpaper from the screen locking stage to AOD stage is the same as or associated with the background wallpaper included in the first frame of AOD interface of the screen-off stage after the terminal exits the displaying of the screen locked interface. For example, a display position of the last frame of picture of the live wallpaper from the screen locking stage to AOD stage is determined according to first AOD position information. The first AOD position information is used for indicating a position of a screen-on region of the last frame of AOD interface of the screen-off stage before the display screen is powered on most recently in response to the screen-on event.

In some embodiments, a layout of wallpaper upper-layer elements included in the last frame of screen locked interface of the screen locking stage is the same as or associated with a layout of wallpaper upper-layer elements included in the first frame of desktop. A display position and display size of the wallpaper upper-layer elements included in the last frame of the screen locked interface of the screen locking stage are determined according to the first AOD position information.

It should be noted that there is no necessary sequence between step 806-1 and step 806-2, and step 806-1 and step 806-2 may be performed at the same time, or step 806-2 may be performed before step 806-1. This is not limited.

807. The screen lock application fades out of or exits the displaying of the screen locked interface when the playing of the live wallpaper from the screen locking stage to the AOD stage ends, and sends an AOD display instruction to the AOD application. It should be noted that the screen lock application fades out of the screen locked interface. Before displaying the AOD interface, the terminal displays a black frame on the display screen and prevents a black screen to the user.

For example, when the screen lock application fades out of the screen locked interface, before the AOD interface is displayed, a flow of switching from the processor to the microprocessor may be involved, so that the terminal is enabled to enter a low-power display mode after being switched to the AOD interface.

808. The AOD application receives the AOD display instruction, and obtains the first AOD position information.

809. The AOD application sends an AOD interface display instruction to the AOD display service, where the AOD interface display instruction includes the first AOD position information.

810. The AOD display service receives the AOD interface display instruction, and triggers the AOD interface to be displayed on the display screen. The display position of the background wallpaper included in the first frame of AOD interface and the wallpaper upper-layer elements included in the first frame of AOD interface are displayed according to the first AOD position information. Therefore, a continuity of presentation of the background wallpaper is maintained during the switching from the screen locked interface to the AOD interface.

Embodiment IV: The following events are taken as an example: The terminal is switched from a desktop to a screen locked interface and then switched from the screen locked interface to the AOD interface; a background wallpaper of a screen-off stage is a static wallpaper; and a background wallpaper of a screen locking stage and a background wallpaper displayed after unlocking are live background wallpapers.

As shown in FIG. 9A, an interface A9 is a desktop. An interface B9 is a blank screen locked interface with a live wallpaper. In this embodiment of this application, the blank screen locked interface may be understood as that the screen locked interface does not include a wallpaper upper-layer element, for example, time or a date. An interface C9 is a screen locked interface with a live wallpaper. The screen locked interface herein refers to a non-blank screen locked interface, that is, the screen locked interface may include a wallpaper upper-layer element. An interface D9 is a black frame. An interface E9 is an AOD interface.

That the interface A9 is used as a desktop is taken as an example. For example, when the terminal displays the interface A9 on the display screen, if the user taps the power key 9, in response to the operation of tapping the power key 9 by the user, the terminal exits or fades out of the displaying of the desktop, triggers playing of a live wallpaper from the desktop stage to the screen locking stage, displays a blank screen locked interface and the live wallpaper on the display screen, and displays a non-blank screen locked interface when the live wallpaper from the desktop stage to the screen locking stage is played to a last frame, then exits or fades out of the displaying of the screen locked interface, and displays the AOD screen on the display screen. An interface obtained by superimposing the non-blank screen locked interface with the last frame of picture of the live wallpaper from the desktop stage to the screen locking stage is the same as or associated with the first frame of AOD interface of the screen-off stage. The non-blank screen locked interface is a last frame of screen locked interface of the screen-off stage. A layout of wallpaper upper-layer elements included in the interface is the same as or associated with a layout of wallpaper upper-layer elements included in the first frame of AOD interface of the screen-off stage, and/or a last frame of picture of the live wallpaper from the desktop to the screen locking stage is the same as or associated with a static wallpaper included in the first frame of AOD interface of the screen-off stage. For example, an interface obtained by superimposing the non-blank screen locked interface with a last frame of the live wallpaper from the desktop stage to the screen locking stage is the interface C9; the first frame of AOD interface of the screen-off stage is the interface E9; the interface C9 and the interface E9 are the same.

In addition, before the terminal fades out of the displaying of the screen locked interface and displays the AOD interface on the display screen, the terminal may be first switched from the processor to the microprocessor, and the microprocessor controls the AOD interface to be displayed, and then powers off the screen, so as to reduce the power consumption of the terminal. It should be noted that in the process of switching from the processor to the microprocessing, the terminal displays a black frame on the display screen, for example, the interface B8, that is, presents a black screen to the user. Then, after being switched to the microprocessor, the terminal displays the AOD interface on the display screen. For example, a duration for the terminal to be switched from the processor to the microprocessor again may be 260 ms to 300 ms. Therefore, after fading out of the screen locked interface and before displaying the AOD interface, a duration to present the black screen to the user may be 260 ms to 300 ms.

Figure 9B:
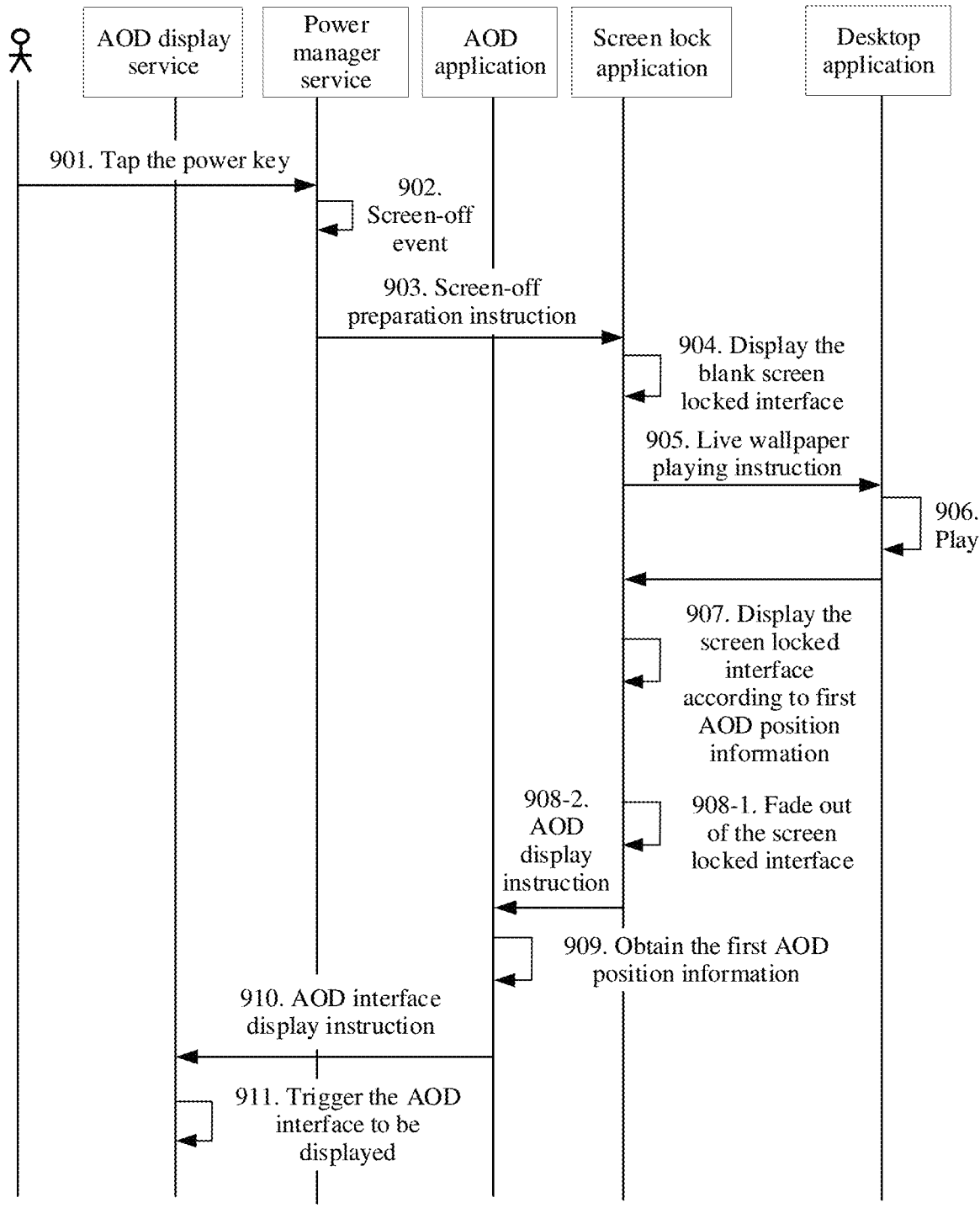
FIG. 9B is a flowchart of another interface display method according to an embodiment of this application.

For example, when the terminal enters the AOD interface from the desktop, a flow of the interface display method may be as shown in FIG. 9B, and specifically includes the following steps.

- 901. The key driver detects an event that the user taps the power key, and sends an indication of the event that the user taps the power key to the power manager service.
- 902. When the screen of the terminal is powered off, the power manager service determines, after receiving the indication of the event that the user taps the power key, that the event that the user taps the power key is used for triggering a screen-off event.
- 903. The power manager service sends a screen-off preparation instruction to the screen lock application.
- 904. The screen lock application receives the screen-off preparation indication, and displays a blank screen locked interface.
- 905. The screen lock application sends a live wallpaper playing instruction to the desktop application. For example, the live wallpaper playing instruction is used for triggering the desktop application to play a live wallpaper from the desktop stage to the AOD stage, or the live wallpaper playing instruction is used for triggering the desktop application to play a live wallpaper from the AOD stage to the desktop stage in a reverse order.

It should be noted that a dynamic effect of the live wallpaper from the desktop stage to the AOD stage and a dynamic effect of the live wallpaper from the AOD stage to the desktop stage are opposite.

In some embodiments, the screen lock application may first send a first live wallpaper playing instruction to the desktop application. The first live wallpaper playing instruction is used for triggering the desktop application to play a live wallpaper from the desktop stage to the screen locking stage, or the first live wallpaper playing instruction is used for triggering the desktop application to play a live wallpaper from the screen locking stage to the desktop stage in a reverse order. Then, the screen lock application sends a second live wallpaper playing instruction to the desktop application after the desktop application finishes the playing according to the first live wallpaper playing instruction. The second live wallpaper playing instruction is used for triggering the desktop application to play a live wallpaper from the screen locking stage to the AOD stage, or the second live wallpaper playing instruction is used for triggering the desktop application to play a live wallpaper from the AOD stage to the screen locking stage in a reverse order.

It should be noted that the first live wallpaper playing instruction may be replaced with a static wallpaper display instruction, and is used for triggering the desktop application to display a static wallpaper from the desktop stage to the screen locking stage. In this case, the static wallpaper is the same as or associated with the first frame of picture of the live wallpaper from the screen locking stage to AOD stage.

Or, the second live wallpaper playing instruction may be replaced with a static wallpaper display instruction, and is used for triggering the desktop application to display a static wallpaper from the screen locking stage to the AOD stage. In this case, the last frame of picture of the live wallpaper from the desktop to the screen locking stage is the same as or associated with the static wallpaper from the screen locking stage to the AOD stage.

For example, the screen lock application may determine, according to a live wallpaper playing end instruction from the desktop application, that the playing of the live wallpaper from the desktop stage to the screen locking stage ends, or may estimate, according to a playing duration of the live wallpaper from the desktop stage to the screen locking stage, that the desktop application finishes playing the live wallpaper from the desktop stage to the screen locking stage.

- 906. After receiving the live wallpaper playing instruction, the desktop application plays the live wallpaper according to the live wallpaper playing instruction.
- 907. When the playing of the live wallpaper ends, the screen lock application displays the screen locked interface according to the first AOD position information, and the desktop application displays the last frame of picture of the live wallpaper according to the first AOD position information. The first AOD position information is used for indicating a position of a screen-on region of the last frame of AOD interface of the screen-off stage before the display screen is powered on most recently in response to the screen-on event.
- 908-1. The screen lock application exits or fades out of the displaying of the screen locked interface.
- 908-2. The screen lock application sends an AOD display instruction to the AOD application.

It should be noted that there is no necessary sequence between step 908-1 and step 908-2. For example, step 908-1 and step 908-2 may be performed at the same time.

- 909. The AOD application receives the AOD display instruction, and obtains the first AOD position information.
- 910. The AOD application sends an AOD interface display instruction to the AOD display service, where the AOD interface display instruction includes the first AOD position information.

911. The AOD display service receives the AOD interface display instruction, and triggers the AOD interface to be displayed on the display screen. The first frame of AOD interface is displayed according to the first AOD position information. Therefore, a continuity of presentation of the background wallpaper is maintained during the switching from the screen locked interface to the AOD interface.

In some embodiments, in the foregoing Embodiment I to Embodiment IV, the terminal triggers the screen-off operation or screen-on operation in response to the tapping of the power key by the user. Certainly, the user may also trigger the screen-on operation or screen-off operation in another manner, for example, in a manner of tapping a home key. The home key may be a virtual key or a physical key. For another example, the user may also trigger the screen-on operation or screen-off operation by a shortcut gesture operation, a voice instruction, or the like. Or, in Embodiment III or Embodiment IV, when the screen is powered on, for example, when a desktop or a screen locked interface is displayed, the terminal device may automatically power off the screen if no user operation is detected within a target duration. The animation display method in this embodiment of this application may also be applicable to a scenario in which a terminal device automatically powers off a screen.

Embodiment II and Embodiment IV are taken as an example. The live wallpapers in the process that the terminal enters the desktop from the AOD interface and the process that the terminal enters the AOD interface from the desktop are played in the reverse order. For example, the live wallpaper in the process that the terminal enters the desktop from the AOD interface is forward played, and the live wallpaper in the process that the terminal enters the AOD interface from the desktop is reversely played. For example, that the forward playing of the live wallpaper is from night to morning is taken as an example. The live wallpaper is played according to an order from night to morning in the process that the terminal enters the desktop from the AOD interface, and the live wallpaper is played according to an order from morning to night in the process that the terminal enters the AOD interface from the desktop.

Figure 10:
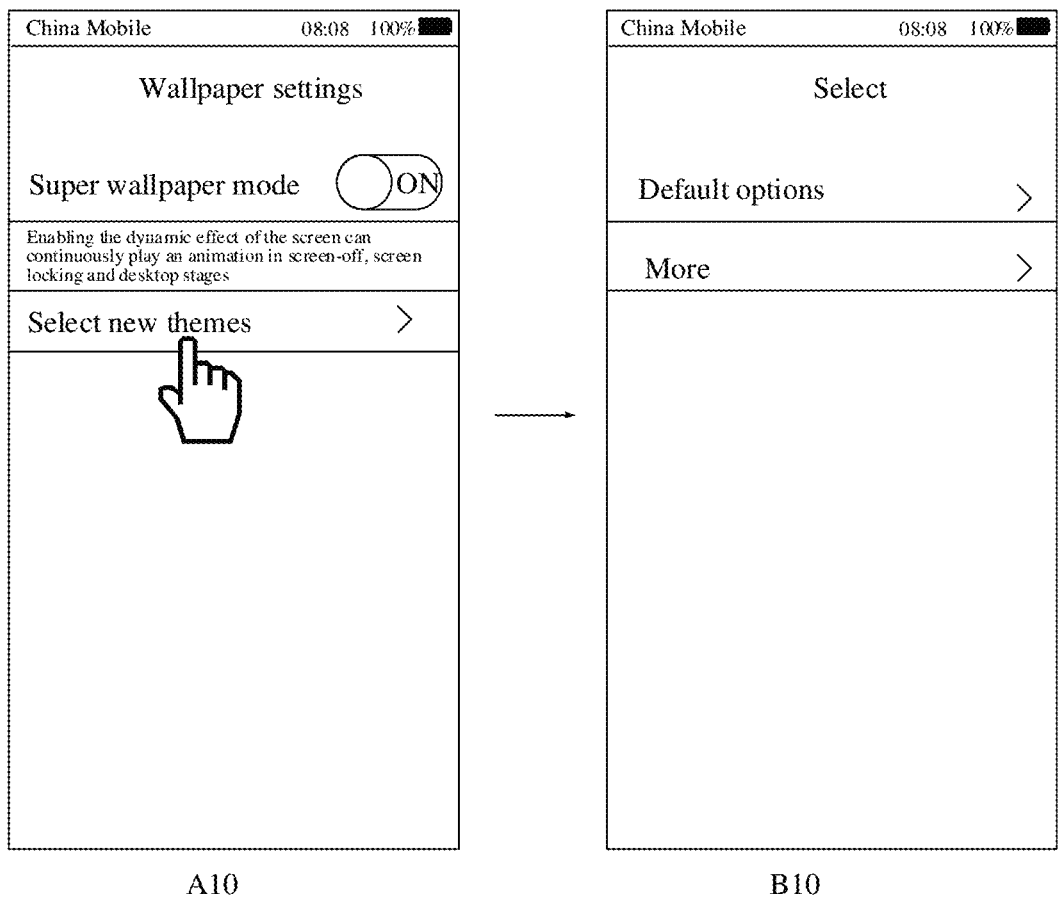
FIG. 10 is a schematic diagram of an interface according to an embodiment of this application.

In addition, in some other embodiments of this application, the user may set AOD-screen locking-desktop wallpapers according to a need of the user. For example, the user may select a corresponding theme from a setting interface, so as to set a background wallpaper on an AOD interface and background wallpapers played in the screen locking phase and the unlocking stage. For example, the user enables a super wallpaper mode on the interface A10 shown in FIG. 10, taps to select a new theme option, and displays the interface B10 on the display screen. A theme option preconfigured in the terminal before the terminal is delivered, and more options are optional theme options provided on a network. The user can select corresponding themes according to needs of the user. In this way, a personalized pursuit of the user is satisfied.

Figure 11:
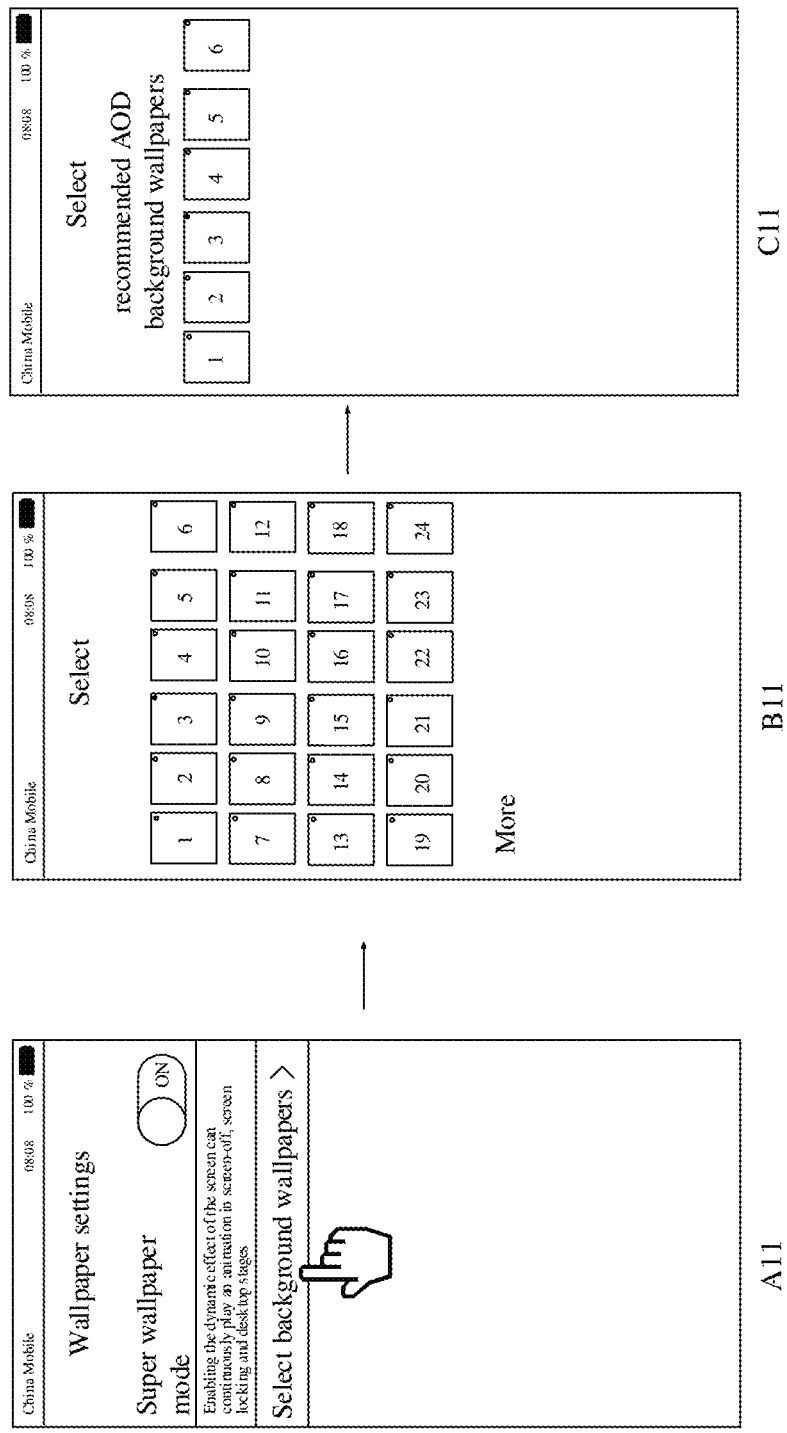
FIG. 11 is a schematic diagram of another interface according to an embodiment of this application.

Or, the user may set a corresponding background wallpaper according to a need of the user, and a background wallpaper displayed on the AOD interface is recommended to the user according to a background wallpaper selected by the user. For example, as shown in FIG. 11, an interface B11 is displayed on the display screen in response to tapping, by the user, an option of selecting a background wallpaper on an interface A11. The interface B11 includes a plurality of optional background wallpaper options. For example, if the user selects a background wallpaper option 4, an interface C11 is displayed on the display screen. The interface C11 includes an option of a background wallpaper that is recommended by the terminal for the background wallpaper option 4 and displayed on the AOD interface.

The foregoing embodiments may be used separately, or may be used in combination to implement different technical effects.

In the foregoing embodiments provided in this application, the method provided in embodiments of this application is described from a perspective of an electronic device serving as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether one of the foregoing functions is performed in the manner of a hardware structure, a software module, or a hardware structure and a software module depends on a specific application and design constraints of the technical solutions.

An embodiment of this application further provides an electronic device, including a display screen, a processor, a memory, one or more sensors, one or more power keys, one or more application programs, and one or more computer programs. The foregoing components may be connected through one or more communication buses. The one or more computer programs are stored in the memory and are configured to be executed by the one or more processors. The one or more computer programs include instructions, and the instructions may be used for enabling the electronic device to perform all the steps of the interface display methods in the foregoing embodiments.

For example, the processor may be specifically the processor 110 shown in FIG. 2. The memory may be specifically the internal storage 120 shown in FIG. 2 and/or an external memory connected to the electronic device. The display screen may be specifically the display screen 130 shown in FIG. 2. The sensor may be specifically one or more sensors in the sensor module 150 shown in FIG. 2. The power key may be the power key 141 shown in FIG. 2. This embodiment of this application does not impose any limitation on this.

In addition, an embodiment of this application further provides a graphical user interface (graphical user interface, GUI) on an electronic device. The GUI specifically includes GUIs displayed when the electronic device performs the foregoing method embodiments.

According to the context, the term "when . . . " used in the foregoing embodiments may be interpreted as a meaning of "if . . . ", "after . . . ", "in response to determining . . . ", or "in response to detecting . . . ". Similarly, the phrases "when it is determined" or "if the [described condition or event] is detected" may be interpreted, depending on the context, as "if it is determined that . . . " or "in response to it is determined that . . . " or "when the [described condition or event] is detected" or "in response to detection of the [described condition or event]".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired manner (for example, by using a coaxial cable, an optical fiber, or a digital subscriber line (DSL)) or a wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, Solid State Disk (SSD)), or the like. In a case in which no conflict occurs, the solutions in the foregoing embodiments may be combined for use.

It should be noted that a part of this patent application document includes copyright protected content. The copyright owner reserves the copyright except copies are made for the patent documents or the recorded content of the patent documents in the Patent Office.

What is claimed is:

1. A method comprising:
    in an always on display (AOD) stage of an electronic device, displaying, by the electronic device, a first interface comprising a first wallpaper and a first wallpaper upper-layer element;
    in the AOD stage of the electronic device, receiving, by the electronic device, a screen-on operation; and
    in response to the screen-on operation, exiting, by the electronic device, the AOD stage, and displaying, by the electronic device, a second interface, the second interface comprises a second wallpaper upper-layer element and a second wallpaper, wherein the second wallpaper is a first frame of a picture of a first live wallpaper, and wherein the first wallpaper is the same as the second wallpaper or a layout of the first wallpaper upper-layer element is the same as a layout of the second wallpaper upper-layer element;
    after displaying, by the electronic device, the second interface, sequentially displaying, by the electronic device, a second frame of picture to a Nth frame of picture of the first live wallpaper, wherein N is a positive integer greater than or equal to 2;
    in a screen locking display stage of the electronic device, receiving, by the electronic device, a screen-off operation indicating to the electronic device to enter the AOD stage;
    in response to the screen-off operation, sequentially displaying, by the electronic device, the Nth frame of picture to the first frame of picture of the first live wallpaper; and
    after displaying the first frame of picture of the first live wallpaper, entering, by the electronic device, the AOD stage and displaying a third interface, the third interface comprising a third wallpaper and a third wallpaper upper-layer element, wherein the third wallpaper is the same as the first wallpaper, and a layout of the third wallpaper upper-layer element is the same as the layout of the first wallpaper upper-layer element.

2. The method according to claim 1, wherein the method further comprises:
    in the screen locking display stage of the electronic device, receiving, by the electronic device, an unlock operation; and displaying, by the electronic device, a fourth interface when receiving the unlock operation, the fourth interface comprising a fourth wallpaper; and
    in response to the unlock operation, exiting, by the electronic device, the screen locking display stage and displaying, by the electronic device, a fifth interface, the fifth interface comprising a fifth wallpaper, wherein the fourth wallpaper is the same as or associated with the fifth wallpaper.

3. The method according to claim 2, wherein the fifth wallpaper is a first frame of picture of a second live wallpaper; and after displaying the fifth interface, the method further comprises:
    displaying, by the electronic device, a second frame of picture to an Mth frame of picture of the second live wallpaper, wherein M is a positive integer greater than or equal to 2.

4. The method according to claim 3, wherein the method further comprises:
    in a screen unlocking display stage of the electronic device, receiving, by the electronic device, a screen-off operation;
    in response to the screen-off operation, exiting, by the electronic device, the screen unlocking display stage, and sequentially displaying, by the electronic device, the Mth frame of picture to the first frame of picture of the second live wallpaper and the Nth frame of picture to the first frame of picture of the first live wallpaper; and
    entering, by the electronic device, the AOD stage after displaying the first frame of picture of the first live wallpaper.

5. The method according to claim 4, wherein the method further comprises:
    displaying, by the electronic device, a sixth interface after entering the AOD stage, wherein the sixth interface comprises a sixth wallpaper, and the sixth wallpaper is the same as or is associated with the first frame of picture of the first live wallpaper.

6. The method according to claim 1, wherein in response to the screen-on operation, exiting, by the electronic device, the AOD stage, and displaying, by the electronic device, the second interface comprises:
    in response to the screen-on operation, obtaining, by the electronic device, first position information, wherein the first position information indicates a position of a screen-on region on the first interface; and
    displaying, by the electronic device, the second interface according to the first position information.

7. The method according to claim 6, wherein the position of the screen-on region comprises a display position of the first wallpaper and a display position of the first wallpaper upper-layer element.

8. The method according to claim 7, wherein displaying, by the electronic device, the second interface according to the first position information comprises:
    determining, by the electronic device, a position of a display object of the second wallpaper according to the display position of the first wallpaper;
    determining, by the electronic device, a display position of the second wallpaper upper-layer element according to the display position of the first wallpaper upper-layer element; and displaying, by the electronic device, the second interface according to the position of the display object and the display position of the second wallpaper upper-layer element.

9. The method according to claim 1, wherein in response to the screen-on operation, exiting, by the electronic device, the AOD stage, and displaying, by the electronic device, the second interface comprises:
in response to the screen-on operation, exiting, by the electronic device, the AOD stage, entering, by the electronic device, a screen locking stage, and displaying, by the electronic device, the second interface.

10. The method according to claim 1, wherein in response to the screen-on operation, exiting, by the electronic device, the AOD stage, and displaying, by the electronic device, the second interface comprises:
in response to the screen-on operation, exiting, by the electronic device, the AOD stage, entering, by the electronic device, a desktop stage, and displaying, by the electronic device, the second interface.

11. An electronic device, comprising at least one processor and at least one non-transitory memory, wherein the one or more memories store one or more computer programs; the one or more computer programs comprise instructions; and when the instructions are executed by the one or more processors, the electronic device is caused to perform:
in an always on display (AOD) stage of the electronic device, displaying a first interface comprising a first wallpaper and a first wallpaper upper-layer element;
in the AOD stage of the electronic device, receiving a screen-on operation; and
in response to the screen-on operation, exiting the AOD stage, and displaying a second interface, the second interface comprising a second wallpaper upper-layer element and a second wallpaper, wherein the second wallpaper is a first frame of a picture of a first live wallpaper, and wherein the first wallpaper is the same as the second wallpaper or a layout of the first wallpaper upper-layer element is the same as a layout of the second wallpaper upper-layer element;
after displaying the second interface, sequentially displaying a second frame of picture to a Nth frame of picture of the first live wallpaper, wherein N is a positive integer greater than or equal to 2;
in a screen locking display stage of the electronic device, receiving a screen-off operation indicating to the electronic device to enter the AOD stage;
in response to the screen-off operation, sequentially displaying the Nth frame of picture to the first frame of picture of the first live wallpaper; and
after displaying the first frame of picture of the first live wallpaper, entering the AOD stage and displaying a third interface, wherein the third interface comprises a third wallpaper and a third wallpaper upper-layer element, wherein the third wallpaper is the same as the first wallpaper, and a layout of the third wallpaper upper-layer element is the same as the layout of the first wallpaper upper-layer element.

12. The electronic device according to claim 11, wherein the electronic device is further caused to perform:
in response to the screen-on operation, obtaining first position information, the first position information indicates a position of a screen-on region on the first interface; and
displaying the second interface according to the first position information.

\* \* \* \* \*

UNITED STATES PATENT AND TRADEMARK OFFICE
CERTIFICATE OF CORRECTION

PATENT NO. : 12,051,358 B2
APPLICATION NO. : 18/044178
DATED : July 30, 2024
INVENTOR(S) : Huang et al.

It is certified that error appears in the above-identified patent and that said Letters Patent is hereby corrected as shown below:

In the Claims

In Column 31, in Claim 1, Line 49, delete "a Nth" and insert -- an Nth --.

In Column 33, in Claim 11, Line 27, delete "of the" and insert -- of an --.

In Column 34, in Claim 11, Line 8, delete "a Nth" and insert -- an Nth --.

Signed and Sealed this
Tenth Day of September, 2024

Katherine Kelly Vidal
*Director of the United States Patent and Trademark Office*